United States Patent
Shigeta

(10) Patent No.: US 6,972,777 B2
(45) Date of Patent: Dec. 6, 2005

(54) IMAGE DISPLAY APPARATUS AND METHOD

(75) Inventor: Kazuyuki Shigeta, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 141 days.

(21) Appl. No.: 09/853,662

(22) Filed: May 14, 2001

(65) Prior Publication Data

US 2002/0008712 A1 Jan. 24, 2002

(30) Foreign Application Priority Data

May 18, 2000 (JP) ............................. 2000-146233
Jul. 7, 2000 (JP) ............................. 2000-206027
May 10, 2001 (JP) ............................. 2001-139842

(51) Int. Cl.$^7$ ............................................. G09G 5/10
(52) U.S. Cl. ........................ 345/690; 345/84; 345/88; 348/70
(58) Field of Search ............................. 345/84, 85, 87, 345/88, 90, 690, 691, 692, 694; 315/169.2, 315/169.3, 11.5, 383; 348/68, 70, 743; 349/8, 349/9; 353/29, 20, 31, 84

(56) References Cited

U.S. PATENT DOCUMENTS

| | | | | |
|---|---|---|---|---|
| 5,371,618 A | * | 12/1994 | Tai et al. ........................ | 349/78 |
| 5,592,188 A | | 1/1997 | Doherty et al. ................ | 345/84 |
| 5,668,568 A | * | 9/1997 | Holloman ...................... | 345/83 |
| 5,798,604 A | * | 8/1998 | Duboc et al. ................ | 313/495 |
| 6,115,084 A | * | 9/2000 | Miyashita et al. ........... | 348/792 |
| 6,219,015 B1 | * | 4/2001 | Bloom et al. ................. | 345/87 |
| 6,259,492 B1 | * | 7/2001 | Imoto et al. .................. | 349/33 |
| 6,317,112 B1 | * | 11/2001 | Handschy et al. ............ | 345/89 |
| 6,449,023 B2 | * | 9/2002 | Swanson et al. .............. | 349/62 |
| 6,456,748 B1 | * | 9/2002 | Yushiya et al. .............. | 382/312 |
| 6,461,008 B1 | * | 10/2002 | Pederson ...................... | 362/35 |
| 6,504,566 B1 | * | 1/2003 | Yamada et al. ............. | 347/240 |
| 6,545,659 B2 | * | 4/2003 | Kuramoto .................... | 345/102 |
| 6,590,606 B1 | * | 7/2003 | Hiller et al. ................. | 348/203 |

FOREIGN PATENT DOCUMENTS

| | | |
|---|---|---|
| JP | 9-149350 | 6/1997 |
| JP | 10-78550 | 3/1998 |

* cited by examiner

Primary Examiner—Alexander Eisen
Assistant Examiner—Abbas Abdulselam
(74) Attorney, Agent, or Firm—Fitzpatrick, Cella, Harper & Scinto

(57) ABSTRACT

For generating a plurality of light beams having different colors, time sequentially switching the light beams, illuminating a space modulation unit with the light beam, and projecting light modulated by and emitted from the space modulation unit, a white light illumination period is provided during a period between illumination periods for the plurality of light beams having different colors. An inexpensive and high quality image display apparatus is provided without using specific electronic circuits and space modulation unit and without using optical systems of high performance and large scale.

15 Claims, 14 Drawing Sheets

IMAGE DISPLAY APPARATUS AND METHOD

BACKGROUND OF THE INVENTION

1. Field of the Invention

The present invention relates to an image display apparatus and more particularly an image display apparatus having a display unit for displaying an image by a color field sequential display method.

2. Related Background Art

Recently, image sources such as movies, TV, home video images, presentations, and TV conference images are often displayed on a large screen display apparatus in offices and homes. As different from a display apparatus for displaying an image by sequentially scanning pixels capable of multi-value display such as conventional CRT and liquid crystal display apparatus, there is a display apparatus which can realize multi-gradation display by using binary value display pixels and pulse width modulating (PWM) a display value of each bit to time divisionally display each bit. As a display apparatus capable of time divisional display, there are a rear type projection TV, a projection projector and the like using a space modulation unit capable of binary display, typically a MEMS (micro-electro-mechanical systems) display such as a ferroelectric liquid crystal (FLC) display and a DMD device of Texas Instruments Incorporated. It is desired that the structure of a display apparatus is simple and that an inexpensive and light display unit is realized to supply products which consumers can easily buy.

Of display apparatus such as projectors, a single plate type display apparatus of a color field sequential display type uses one space modulation unit to sequentially display an image of each color and visually synthesize the images of different colors to realize color display. As compared with a conventional three-plate type display apparatus, the cost of the space modulation unit and peripheral circuits of such a single plate type display apparatus can be reduced to ⅓ and the optical system and electronic circuit system can be simplified. Therefore, an inexpensive and light display unit can be realized. As a color field sequential display method, color filters are made of liquid crystal capable of high speed response and switched therebetween, or a rotary color filter is rotated to switch between color areas.

FIG. 3 is a schematic diagram showing the structure of a projection type image display apparatus of a single plate type as one example of conventional display apparatus. In FIG. 3, reference numeral 3-1 represents an input unit for inputting an image signal (video signal), reference numeral 3-2 represents a signal processing unit for adjusting the image quality, such as a luminance, color characteristics, and gamma characteristics, of an input image signal and converting the image signal into a pulse width modulated time divisional signal suitable for driving a display unit, and for generating timing pulses for driving the display unit.

Reference numeral 3-3 represents a data bus for transferring a time divisional signal to the display unit, and reference numeral 3-4 represents a control line for transferring a drive pulse to the display unit. Reference numeral 3-5 represents a space modulation unit of binary value display, typically a micro-electro-mechanical systems (MEMS) type space modulation unit such as a ferroelectric liquid crystal (FLC) device and a DMD device of Texas Instruments Incorporated. This space modulation unit is a reflection type display unit which reflects light. Reference numeral 3-6 represents a light source lamp. A metal halide lamp or the like is used for the projection type display apparatus. Reference numeral 3-7 represents a ballast and a power source for driving the lamp.

Reference numeral 3-8 represents an illumination optical system for passing light from the lamp 3-6 through a rotary color filter 3-12 to form monochromatic light which changes with time and applied to the space modulation unit 3-5. Reference numerals 3-9 and 3-10 represent lenses. Reference numeral 3-11 represents a motor drive unit for rotating the rotary color filter. Reference numeral 3-16 indicates a spot of converged illumination light passing through the color filter.

Reference numeral 3-13 represents a projection optical system for projecting light space-modulated by the space modulation unit 3-5 and containing display information, upon a display screen 3-15. Reference numeral 3-14 represents a lens and reference numeral 3-15 represents a screen.

Light emitted from the lamp 3-6 passes through the rotary filter 3-12 to be converted into illumination light of color field sequential RGB. In accordance with drive signals 3-3 and 3-4 obtained by converting an image signal input from the input unit 3-1 into a time divisional signal at the signal processing unit 3-2, the space modulation unit 3-5 reflects space modulation light subjected to binary pulse width modulation. Space-modulated light is projected and displayed on the screen 3-15 via the projection optical system 3-13.

FIG. 4 shows an example of a color filter plate corresponding to the color filter 3-12 shown in FIG. 3. In this example, the color filter is divided into three areas, R (red) light transmitting area 4-1, G (green) light transmitting area 4-2 and B (blue) light transmitting area 4-3. Reference numerals 4-4, 4-5 and 4-6 represent boundaries between color filter areas.

FIG. 5 is a block diagram showing an example of the structure of a signal processing unit corresponding to the signal processing unit 3-2 shown in FIG. 3. Reference numeral 5-1 represents an input unit for an image signal corresponding to the input unit 3-1 shown in FIG. 3. Of the input unit 3-1, an input terminal for an image signal is represented by 5-2-1, an input terminal for a horizontal sync signal (IHD) is represented by 5-3-1, an input terminal for a vertical sync signal (IVD) is represented by 5-4-1, and an input terminal for a clock (ICLK) is represented by 5-5-1. Reference numerals 5-2-2, 5-2-3, 5-2-4, and 5-2-5 represent a data bus for an image signal, reference numeral 5-3-2 represents a signal line for the horizontal sync signal (IHD), reference numeral 5-4-2 represents a signal line for the vertical sync signal (IVD), and reference numeral 5-5-2 represents a signal line for the clock (ICLK).

Reference numeral 5-6 represents an image input unit including a decoder for decoding a received signal of a TMDS format into data of 24 bits (8 bits for each RGB), a decoder for decoding a compressed signal of a MPEG format received via IEEE1394 into data of 24 bits (8 bits for each RGB), and the like. The TMDS format is adopted by the digital visual interface (DVI) specification or the like standardized by a standardizing group "Digital Display Working Group (DDWG)".

Reference numeral 5-7 represents a format convertor which performs: resolution conversion of an image signal having a resolution mismatching the number of display pixels of an image display unit, the resolution conversion including a multiplication factor conversion process and an interpolation process; conversion of image refreshing frequency; non-interlacing; and color matrix conversion. Reference numeral 5-8 represents a memory to be used as an image storage area necessary for image processing by the format convertor. Reference numeral 5-20 represents a control line group of the memory, and reference numeral 5-21 represents a data line group for transferring data between the memory and format convertor. Reference numeral 5-9 represents a crystal oscillator. In accordance with a clock (OCLK) generated by the crystal oscillator and under the control of a microcomputer not shown in FIG. 5, the format convertor 5-7 generates a horizontal sync signal (OHD) and a vertical sync signal (OVD) necessary for synchronization after the format conversion. Reference numeral 5-10 represents a signal line for the horizontal sync signal (OHD), reference numeral 5-11 represents a signal line for the vertical sync signal (OVD), and reference numeral 5-12 represents a signal line for the clock (OCLK) generated by the crystal oscillator.

Reference numeral 5-13 represents an image quality adjustor for receiving an image signal after the format conversion and adjusting the image quality such as a luminance, color characteristics and gamma characteristics as viewed on the space modulation unit as an image display unit, under the control of a microcomputer not shown in FIG. 5.

Reference numeral 5-14 represents a PWM convertor for converting an image signal sequentially scanned into a time divisional display signal through pulse width modulation (PWM). Reference numeral 5-15 represents a memory for storing a time divisional drive sequence which describes the order of PWM modulated data and display timings. Reference numeral 5-16 represents a PWM drive timing generator for receiving the time divisional drive sequence and generating drive timings for the PWM convertor 5-14 and the space modulation unit as the image display unit. Reference numeral 5-17 represents a transmission line for drive sequence data from the time divisional drive sequence memory 5-15 to the PWM drive timing generator 5-16. Reference numeral 5-18-1 represents a control line group (corresponding to the group 3-4 shown in FIG. 3) for drive pulses and the like generated by the PWM drive timing generator 5-16. Reference numeral 5-18-2 represents an output terminal of a control signal such as a drive pulse to be output to the space modulation unit as the image display unit. Reference numeral 5-19-1 represents a data bus (corresponding to the data bus 3-3 shown in FIG. 3) for image data converted by the PWM convertor 5-14, and reference numeral 5-19-2 represents an output terminal for image data which is output to the space modulation unit.

In accordance with the sequence data stored in the time divisional drive sequence memory 5-15, the PWM drive timing generator 5-16 generates a control signal for the PWM convertor 5-14 and a drive pulse for the space modulation unit. An image signal input to the input unit is subjected to proper format conversion and image quality adjustment, and thereafter converted into a time divisional drive signal by the PWM convertor 5-14. Both the PWM convertor and space modulation unit are driven synchronously.

FIG. 6 shows an example of a display data train PWM modulated by the PWM convertor 5-14 shown in FIG. 5. In FIG. 6 the horizontal axis direction represents time. Reference numeral 6-1 represents a start pulse for an image display of each RGB in one field. One field is constituted of an R period 6-2, a G period 6-3, and a next B period not shown in FIG. 6.

Reference numeral 6-4 represents PWM modulated R display data. For the purposes of simplicity, the display data is represented by 6 bits, a first bit 6-6, a second bit 6-7, a third bit 6-8, a fourth bit 6-9, a fifth bit 6-10, and a sixth bit 6-11. The second bit 6-7 has a length two times that of the first bit 6-6, the third bit 6-8 has a length two times that of the second bit 6-7, and so on. The length of the pulse is elongated two times as the order of bits advances. Since the signal is modulated to have a pulse width corresponding to each bit and the space modulation unit reflects light, an image of each color in each field is displayed by using an integrated value during each color period in the field. Reference numeral 6-5 represents PWM modulated G display data having a first bit 6-12, a second bit 6-13, a third bit 6-14, a fourth bit 6-15, a fifth bit 6-16, and a sixth bit 6-17.

In the space modulation unit, a period 6-18 is a non-display period between the B and R display periods, an R display period is represented by 6-19, a period 6-20 is a non-display period between the R and G display periods, and a G display period is represented by 6-21.

Consider now the positional relation of a spot diameter of illumination light on the rotary filter and the color boundaries of the color filter. Referring to FIG. 7, reference numeral 7-1 represents a spot of illumination light on the rotary color filter, and reference numeral 7-2 represents an area of the space modulation unit in which the spot is illuminated. Reference numeral 7-3 represents a rotation center of the color filter. Reference numerals 7-4 and 7-5 represent boundaries of different color filter areas, and reference numerals 7-6 and 7-7 represent cross points between the boundaries and the area of the space modulation unit. As apparent from FIG. 7, the boundary of the color filter first crosses the point 7-6 of the space modulation unit, and at some time later, crosses the point 7-7. The time when the boundary of the color filter crosses the point 7-6 of the space modulation unit is different from the time when the boundary of the color filter crosses the point 7-7. Therefore, during this period, light of two different colors is illuminated on the same display area of the space modulation unit.

Reverting to FIG. 6, reference numeral 6-22 represents a color period of the color filter at the point 7-6 shown in FIG. 7, reference numeral 6-23 represents an R color period, and reference numeral 6-24 represents a G color period. Reference numeral 6-25 represents a color period of the color filter at the point 7-7 shown in FIG. 7, reference numeral 6-26 represents an R color period, and reference numeral 6-27 represents a G color period.

As seen from FIG. 6, during the periods 6-28 and 6-29, light of two different colors is illuminated on the same display area of the space modulation unit. In the case of a rotary color filter, while spot light passes through the boundary of the color filter, color mixture occurs. A similar problem also occurs when liquid crystal color filters are alternately switched. In this case, during a response period of liquid crystal during alternate switching of the color filters, color mixture continues. Conventionally, such a color mixture period is used as the non-display period, or used also as the display period in order to raise the luminance although color mixture exists.

These methods are, however, associated with a degraded image quality. With the method of using the alternate switching period as the non-display period, the light use period is shortened so that the luminance lowers. If the switching period is used as the display period, color purity is degraded because of color mixture.

If the image refreshing frequency is raised in order to suppress a color breakdown phenomenon characteristic to a color field sequential display method, a ratio of the alternate switching period with color mixture to one color display period increases so that the image quality is degraded considerably. If the image refreshing frequency is raised in order to suppress the color breakdown phenomenon, the display unit is required to operate at high speed. Therefore, it is desired that the color breakdown phenomenon be suppressed by a method different from the image refreshing frequency rasing method.

SUMMARY OF THE INVENTION

It is an object of the invention to provide an image display apparatus which can be made inexpensive and can provide a high quality image, without using specific electronic circuits and a specific space modulation unit and without using a high performance and large scale optical system.

In order to solve the above problem, the present invention provides a first image display apparatus comprising: space modulation means for modulating incident light and emitting the modulated incidence light; illumination means for generating a plurality of light beams having different colors, time sequentially switching the generated light beams and illuminating the space modulation means with the light beam; and projection means for projecting light emitted from the space modulation means upon an image display screen, wherein a white light illumination period is provided for the illumination means per each interval between illumination periods for the plurality of light beams having different colors.

A second image display apparatus of this invention comprises: space modulation means for modulating incident light and emitting the modulated incidence light; illumination means for generating a plurality of light beams having different colors, time sequentially switching the generated light beams and illuminating the space modulation means with the light beam; and projection means for projecting light emitted from the space modulation means upon an image display screen, wherein the illumination means has a white light illumination period having a length corresponding to an illumination light transition period provided per each interval between illumination periods for the plurality of light beams having different colors, and the space modulation means repeats modulation twice during a signal period overlapping the white light illumination period, by using a same modulated signal for a white light gradation display having a length corresponding to an illumination light transition period to thereby set the signal period having a length twice the illumination light transition period.

A third image display apparatus of the invention comprises: space modulation means for modulating incident light and emitting the modulated incidence light; illumination means for generating light beams of three primary colors of red (R), green (G) and blue (B), time sequentially switching the generated light beams and illuminating the space modulation means with the light beam; and projection means for projecting light emitted from the space modulation means upon an image display screen, wherein the illumination means has a plurality of groups each having at least each of three boundary period between red and green, green and blue, and blue and red, respectively of illumination periods of the three primary colors, and the plurality of groups including a first group having a white light illumination period having a length corresponding to an illumination light transition period during each boundary period and a second group without the white light illumination period during each boundary period.

In the third image display apparatus, it is preferable that for the first group, a same modulated signal for a white light gradation display having a length corresponding to the illumination light transition period is applied twice to set the signal period having a length twice the illumination light transition period, the signal period overlapping the white light illumination period, a same signal being applied to a same group during each of the three boundary periods between red and green, green and blue, and blue and red, and that for the second group, a modulated signal for the white light gradation display having a length corresponding to the illumination light transition period is applied once, a signal period overlapping the white light illumination period, and a same signal being applied to a same group during each of the three boundary periods between red and green, green and blue, and blue and red.

A first image display method of this invention of generating a plurality of light beams having different colors, time sequentially switching the generated light beams, illuminating a space modulation means with the light beam, and projecting light modulated by and output from the space modulation means upon an image display screen, wherein a white light illumination period is provided in each period between illumination periods for the plurality of light beams having different colors.

It is preferable that during the white light illumination period provided in each period between illumination periods for the plurality of light beams having different colors, a white luminance emphasizing process is dispersively performed. For example, a white light illumination period having a length corresponding to an illumination light transition period is provided in each period between illumination periods for the plurality of light beams having different colors, and an operation of the space modulation means overlaps the white light illumination period by applying a modulated signal for a white light gradation display having a length corresponding to the illumination light transition period.

A second image display method of this invention of generating a plurality of light beams of three primary colors, time sequentially switching the generated light beams, illuminating a space modulation means with the light beam, and projecting light modulated by and output from the space modulation means upon an image display screen, wherein of a plurality of groups each having at least each of three boundary period between red and green, green and blue, and blue and red, respectively of illumination periods of the three primary colors, of the plurality of groups, at least one group is supplied with a signal different from signals supplied to other groups, and a same group is applied with a same signal during each of the three boundary period between red and green, green and blue, and blue and red.

It is preferable that a plurality of groups each having at least each of three boundary period between red and green, green and blue, and blue and red, respectively of illumination periods of the three primary colors, include a first group having a white light illumination period having a length corresponding to an illumination light transition period during each boundary period and a second group without the white light illumination period during each boundary period.

In the third image display method, for the first group, a same modulated signal for a white light gradation display having a length corresponding to the illumination light transition period is applied twice to set the signal period having a length twice the illumination light transition period, the signal period overlapping the white light illumination period, a same signal being applied to a same group during each of the three boundary periods between red and green, green and blue, and blue and red, and for the second group, a modulated signal for the white light gradation display having a length corresponding to the illumination light transition period is applied once, a signal period overlapping the white light illumination period, and a same signal being applied to a same group during each of the three boundary periods between red and green, green and blue, and blue and red.

The space modulation unit may be any unit so long as it can modulate incident light and emitting it, such as a space modulation unit using liquid crystal, a MEMS type space modulation unit and a space modulation unit disposed with micro mirrors. These space modulation units may be any type capable of color field sequential display, such as a binary value display device realizing multi value display through time divisional drive and a multi value device of the type that an analog gradation signal is charged in a pixel such as liquid crystal.

The illumination means may generate color field sequential illumination light by using a rotary color filter divided into areas having different transmission wavelength bands, by switching a plurality of liquid filters having different transmission wavelength bands, or by switching light sources such as LED.

The invention also provides a program for allowing a computer to realize the function of each means of the image display apparatus or a program for allowing a computer to realize the image display method, the program being provided via a storage medium or communication medium.

In an image display apparatus according to a preferred embodiment of the invention, light beams having different colors are sequentially switched to illuminate a space modulation unit and an image is displayed by using obtained color field sequential space modulation light, wherein a white light illumination period is provided in each period between color illumination periods and a white illuminance emphasizing process is dispersively performed between respective colors. The period of inserting a white luminance emphasizing signal is set longer than the white light illumination period and overlapped with the color illumination period other than white light.

It is therefore possible to use a color boundary period which cannot be used conventionally because of color mixture and to improve a light use efficiency. Furthermore, since some color mixture conventionally generated in the color boundary period does not overlap different colors, color purity can be improved.

The said illumination means has a white light illumination period having a length corresponding to an illumination light transition period provided in each period between illumination periods for the plurality of light beams having different colors, and the space modulation means repeats modulation twice during a signal period overlapping the white light illumination period, by using a same modulated signal for a white light gradation display having a length corresponding to an illumination light transition period to thereby set the signal period having a length twice the illumination light transition period.

It is therefore possible to make uniform the relation between illumination light and signals on the display surface of the space modulation unit. A multi level signal can be used as a signal applied during the white light illumination period, and a high image quality can be obtained through a flexible luminance emphasizing process.

Alternatively, the illumination means has a plurality of groups each having at least each of three boundary period between red and green, green and blue, and blue and red, respectively of illumination periods of the three primary colors, and the plurality of groups includes a first group having a white light illumination period having a length corresponding to an illumination light transition period during each boundary period and a second group without the white light illumination period during each boundary period.

In the image display apparatus, for the first group, a same modulated signal for a white light gradation display having a length corresponding to the illumination light transition period is applied twice to set the signal period having a length twice the illumination light transition period, the signal period overlapping the white light illumination period, a same signal being applied to a same group during each of the three boundary periods between red and green, green and blue, and blue and red, and for the second group, a modulated signal for the white light gradation display having a length corresponding to the illumination light transition period is applied once, a signal period overlapping the white light illumination period, and a same signal being applied to a same group during each of the three boundary periods between red and green, green and blue, and blue and red.

By using a combination of a group with a boundary period having a white color illumination period and a group with a boundary area without the white color illumination period, a proper luminance emphasizing effect can be obtained even if the number of divisional color segments of a rotary color filter is increased or even if a color switching speed of illumination color is increased. If signals for a plurality of groups are used in combination, the number of gradation levels of a luminance emphasizing signal can be increased although the number of levels is insufficient if one group is used, and an image display apparatus providing rich expression can be realized.

DETAILED DESCRIPTION OF THE PREFERRED EMBODIMENTS

Embodiments of the invention will be described with reference to the accompanying drawings.

First Embodiment

Figure 3:
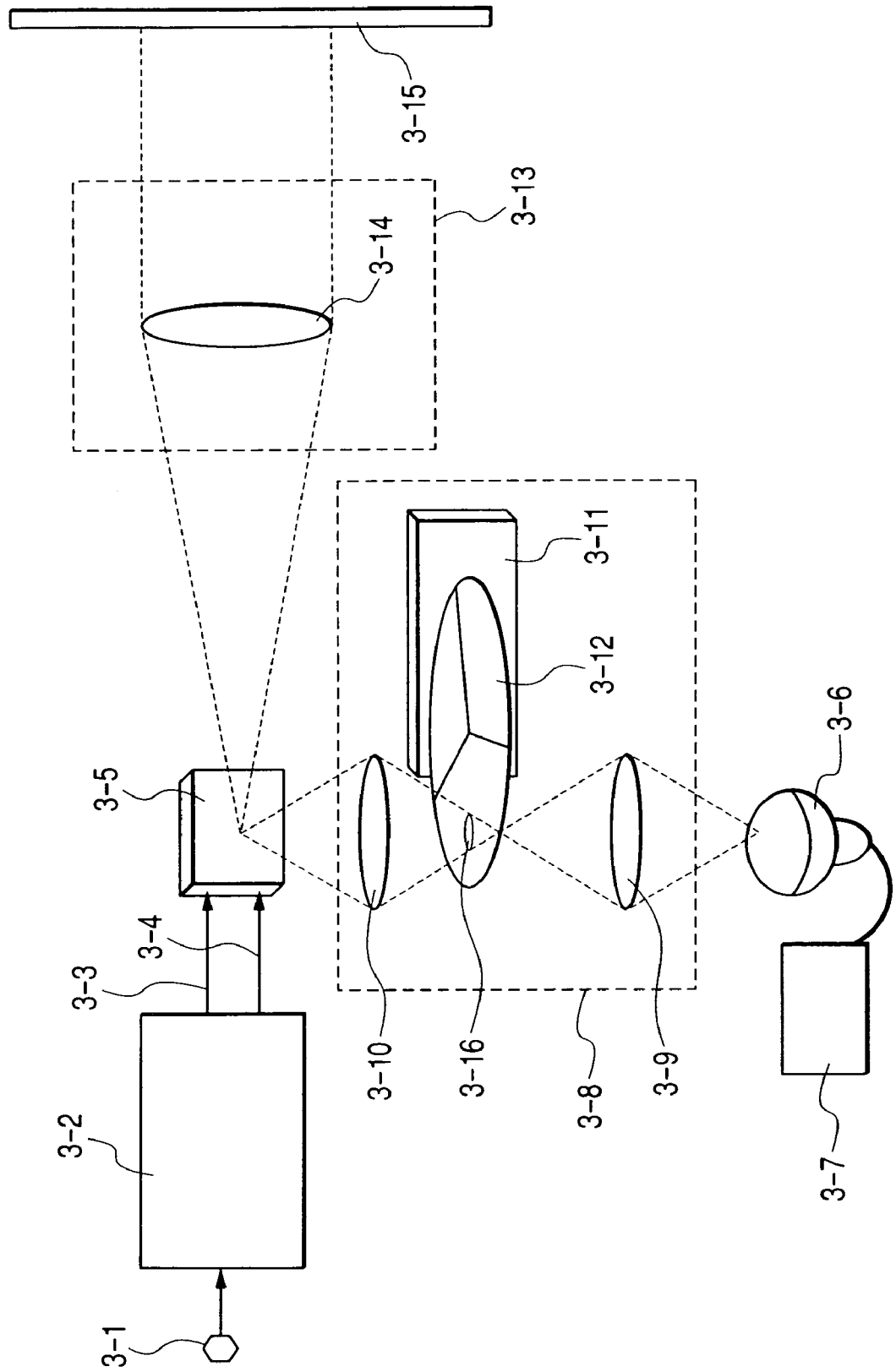
FIG. 3 is a diagram showing the structure of a projection type image display apparatus of a single plate type utilizing a color field sequential display method.
Figure 4:
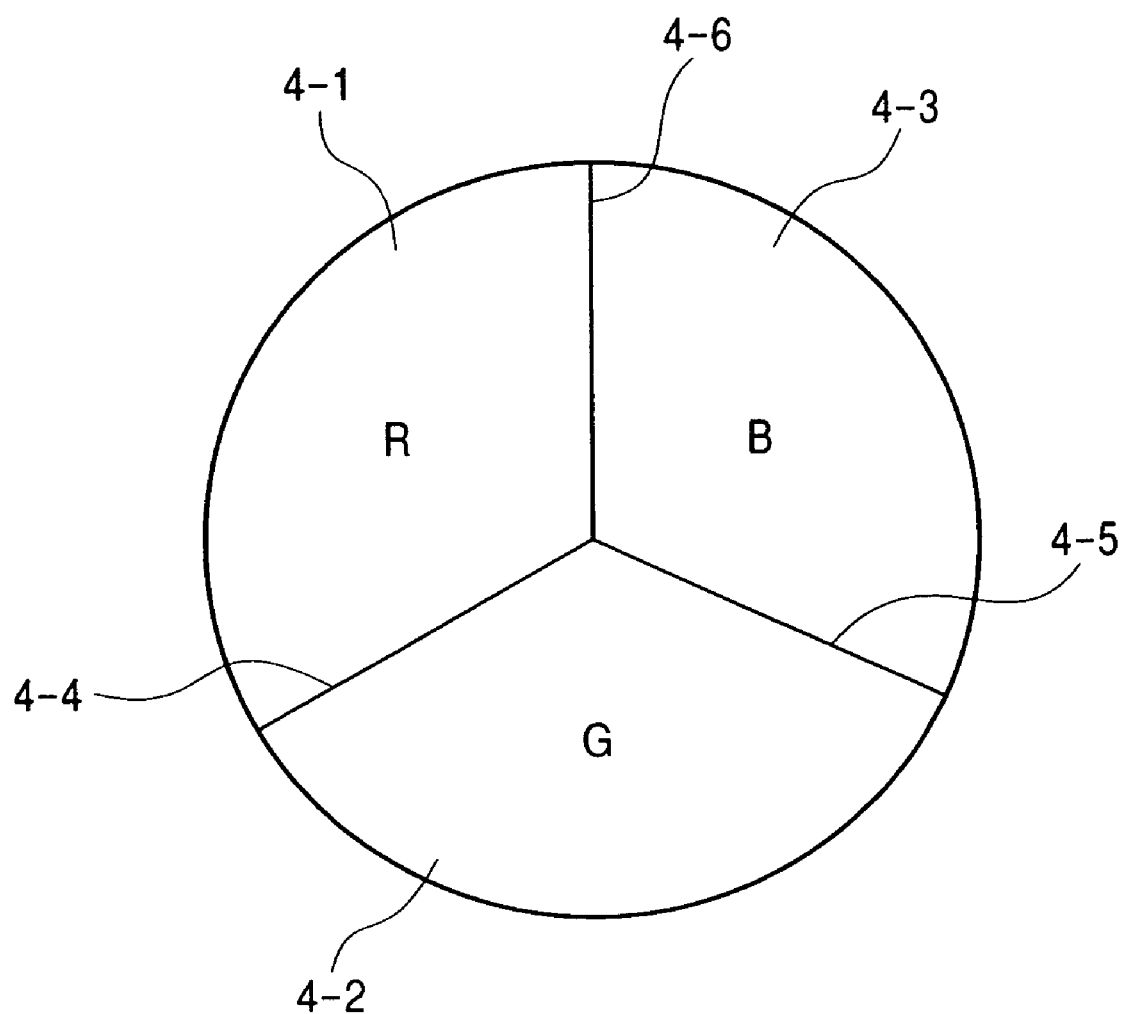
FIG. 4 is a diagram showing an example of the structure of a rotary color filter utilizing a conventional color field sequential display method.
Figure 5:
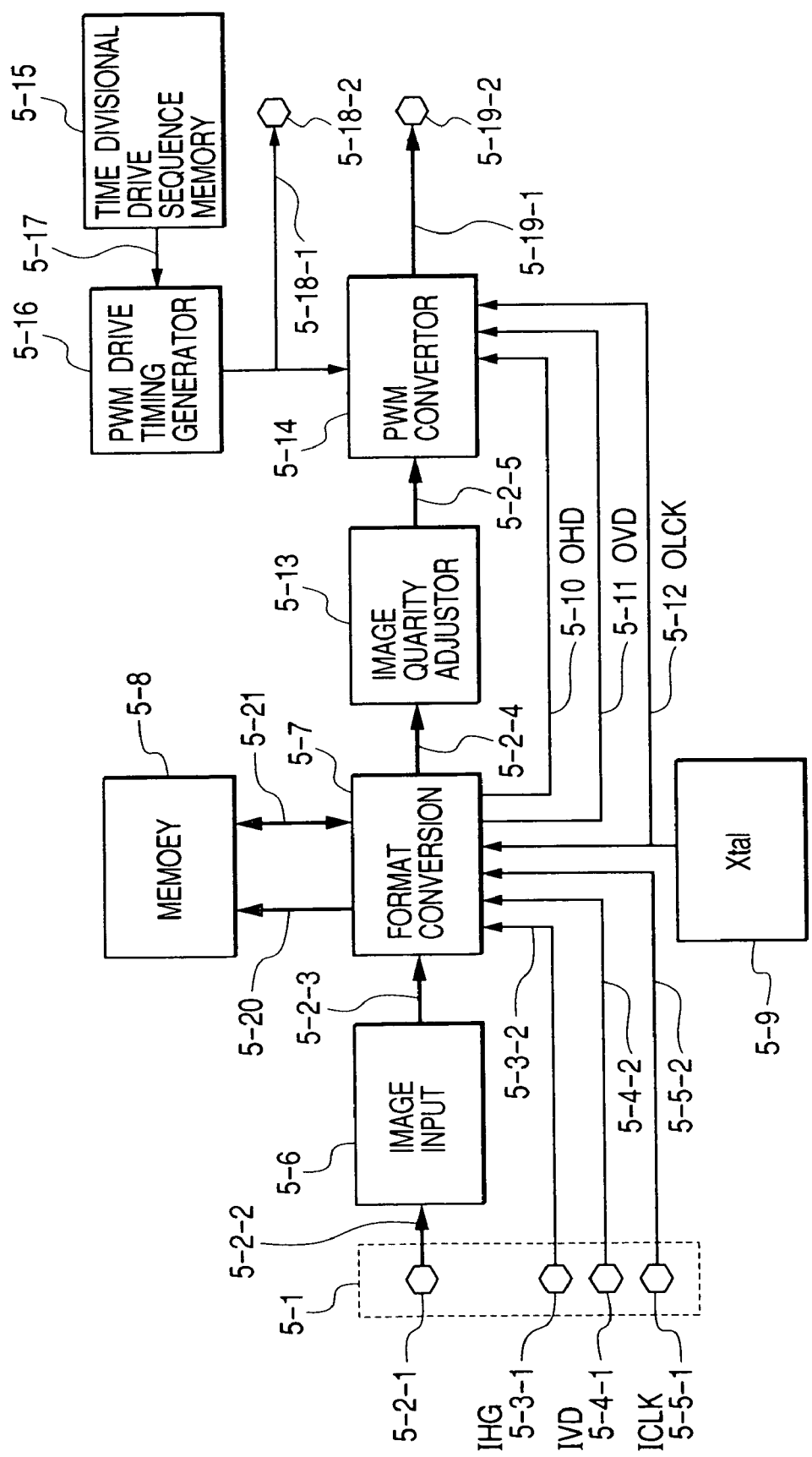
FIG. 5 is a diagram showing the structure of an image processing unit of an image display apparatus.
Figure 6:
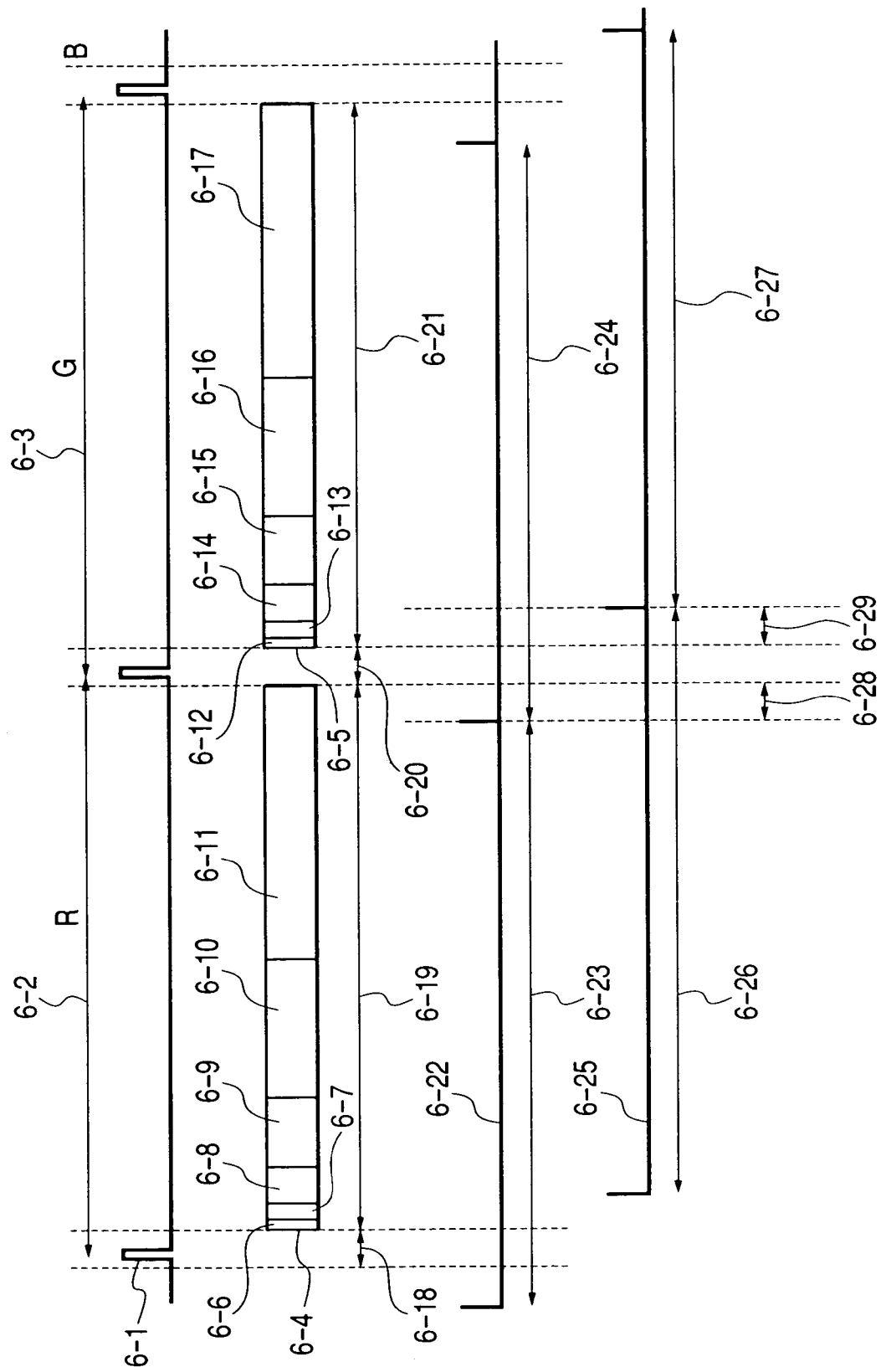
FIG. 6 is a timing chart illustrating the operation of a conventional image display apparatus.

The first embodiment of the invention describes a projection type image display apparatus of a single plate type. The structure of the projection type image display apparatus of the first embodiment is similar to that shown in FIG. 3, excepting the structure of a rotary color filter plate. A rotary color filter plate corresponding to the plate 3-12 shown in FIG. 3 is characteristic to this embodiment and has the structure shown in FIG. 1.

Figure 1:
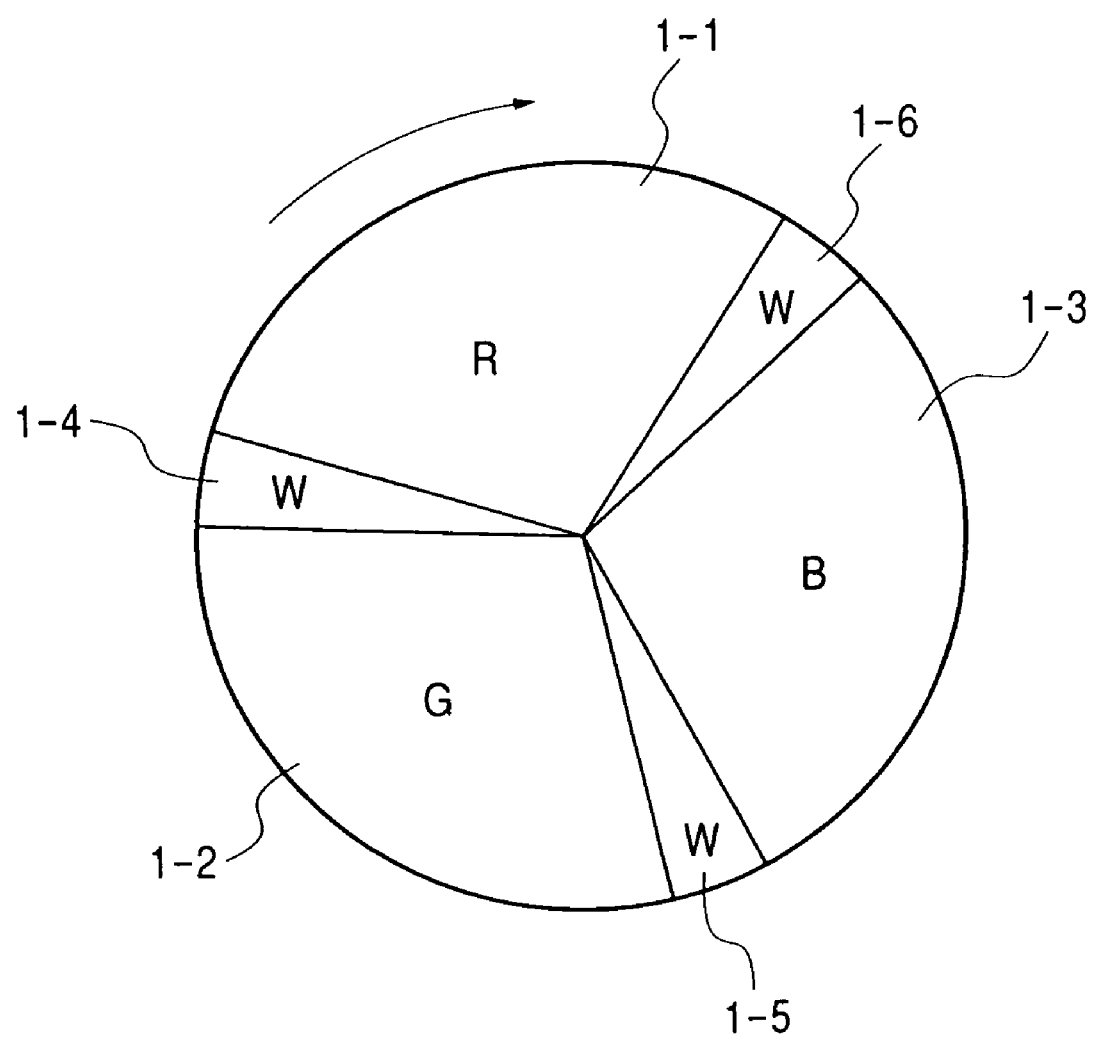
FIG. 1 is a diagram showing the structure of a rotary color filter according to a first embodiment of the invention.

Referring to FIG. 1, a color filter has, in addition to the conventional three divisional color areas (FIG. 3), three white (W) areas set to the three color boundary areas between R and G, G and B, and B and R. The color filter has an R (red) light transmitting area 1-1, a G (green) light transmitting area 1-2 and a B (blue) light transmitting area 1-3, as well as three white (W) areas 1-4, 1-5 and 1-6 set to the boundary areas between RGB colors.

In this embodiment, a white area is set to each color boundary area to dispersively perform a white luminance emphasizing process. The phrase "to dispersively perform" means to perform white display in one screen or one field by dispersing a white display PWM (pulse width modulation) signal into three color boundary areas between R and G, G and B, and B and R without performing white display by using only one white area, similar to RGB display.

Figure 8:
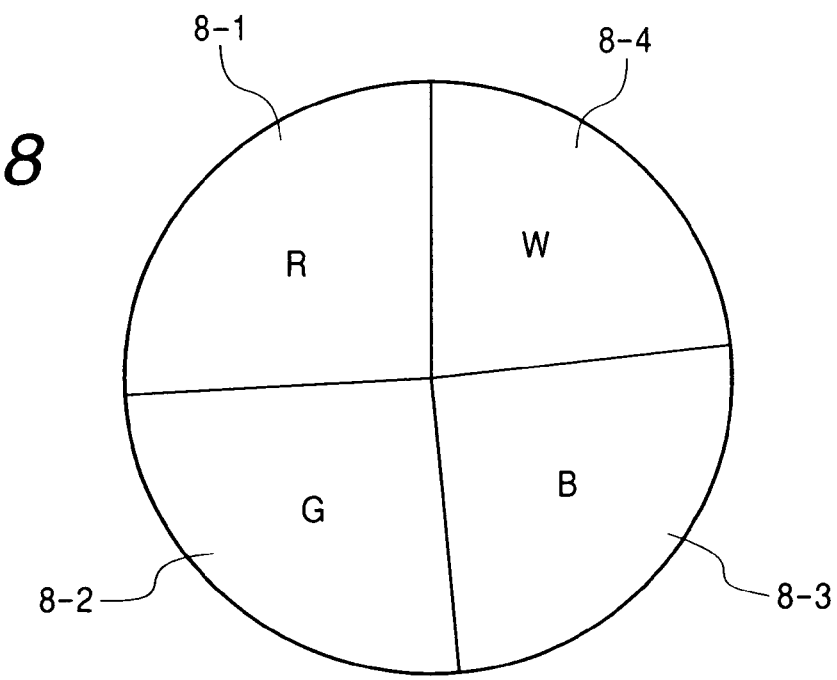
FIG. 8 is a diagram showing the structure of a conventional rotary color filter for performing a white luminance emphasizing process.

The white luminance emphasizing process will be described. With the color field sequential display method for sequentially displaying each RGB color signal, G and B light components are discarded for R display, R and B light components are discarded for G display, and G and R light components are discarded for B display. Therefore, a light use efficiency lowers basically to about ⅓ and the luminance is insufficient. In order to compensate for this, a method is known by which for a white signal level in excess of some signal level, white display is performed in a white display area by using a white luminance emphasizing signal so that the white luminance is quasi emphasized. FIG. 8 shows an example of the structure of a color filter of a display apparatus having such a white luminance emphasizing function. This color filter has an R (red) light transmitting area 8-1, a G (green) light transmitting area 8-2, a B (blue) light transmitting area 8-3 and an area 8-4 used for W (white) emphasizing display.

Figure 9:
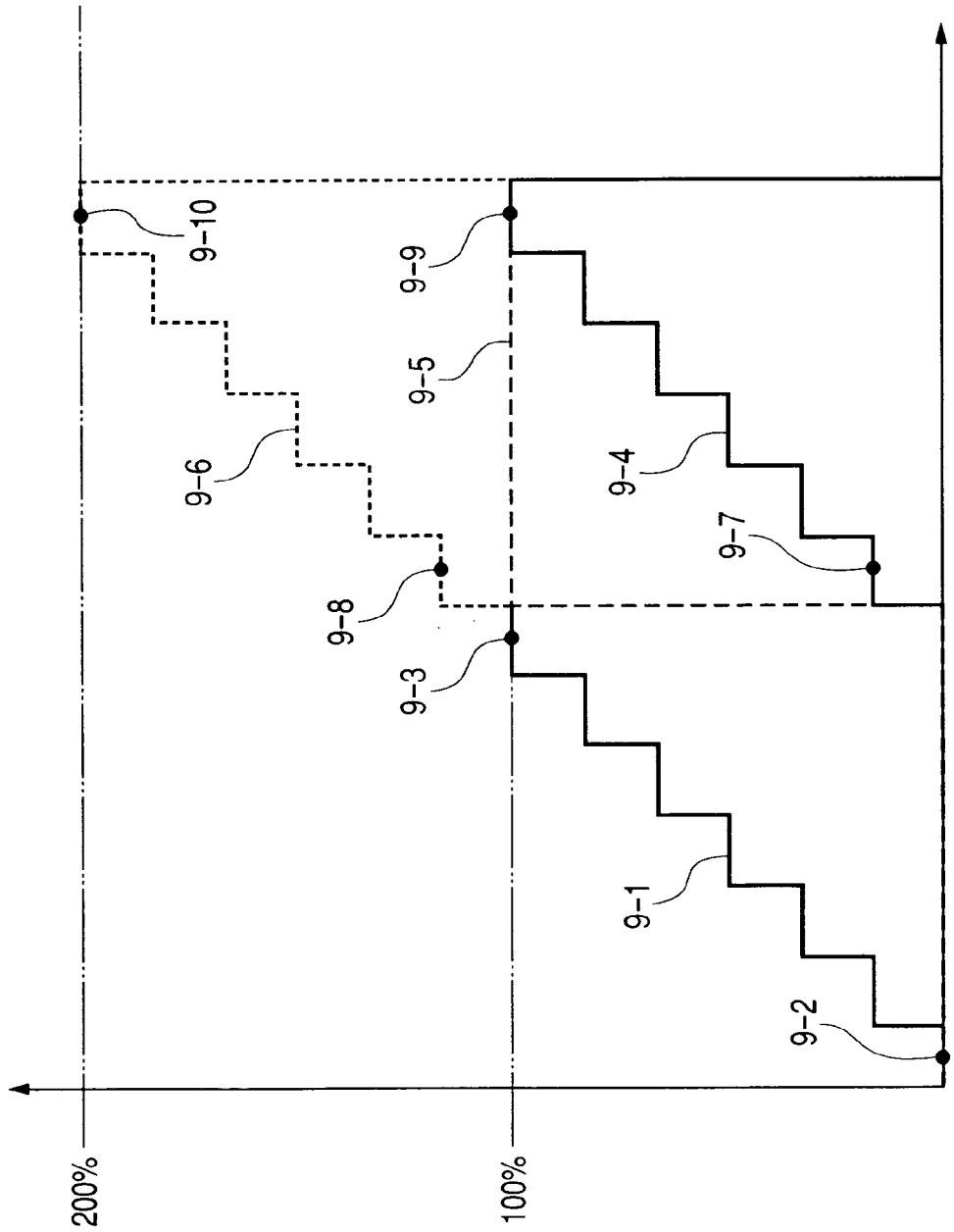
FIG. 9 is a diagram illustrating the while luminance emphasizing process.

FIG. 9 is a diagram illustrating a display luminance level of a display apparatus. The vertical axis represents a display luminance level of the display apparatus. Solid lines 9-1 and 9-4 indicate a display luminance level corresponding to the signal level stepwise changing from 0 to 100%. A broken line 9-6 indicates a display luminance level from 100 to 200% realized by the white luminance emphasizing process. Points 9-2 and 9-3 are on the line 9-1, and points 9-7 and 9-9 are on the line 9-4. Points 9-8 and 9-10 are on the line 9-6. A broad broken line 9-5 indicates the display luminance level in the white display area by a white luminance emphasizing signal.

In the ordinary case without the white luminance emphasizing process, the displayable level is from 0 to 100% as indicated by the line 9-1. In the ordinary case, a signal corresponding to that on the line 9-1 is used for each RGB to produce a luminance from 0 to 100%. Therefore, the luminance range from the point 9-2 to the point 9-3 corresponds to the display range of the display apparatus.

In the white luminance emphasizing process, the display apparatus derives a white signal common to all of R, G and B, and supplies the signal in excess of some signal level with a luminance emphasizing signal 9-5 to perform white display in the white display area.

In this case, a difference signal obtained by subtracting the luminance emphasizing signal from each color signal is displayed in each color display area. The line 9-4 corresponds to a display by the difference signal. The luminance level 9-6 synthesizing the lines 9-4 and 9-5 is a final actual display luminance level. The point 9-7 is therefore changed to the point 9-8 for display, and the point 9-9 is changed to the point 9-10 for display.

This white luminance emphasizing process is effective for emphasizing a white display peak. However, since the number of divisions of a color filter increases from three divisions to four divisions, a ratio of an area of an illumination light spot to a display area increases, which results in a lowered light use efficiency. Furthermore, there is a possibility that color mixture occurs in each color boundary area. The invention also solves such a problem associated with the white luminance emphasizing process.

Figure 2:
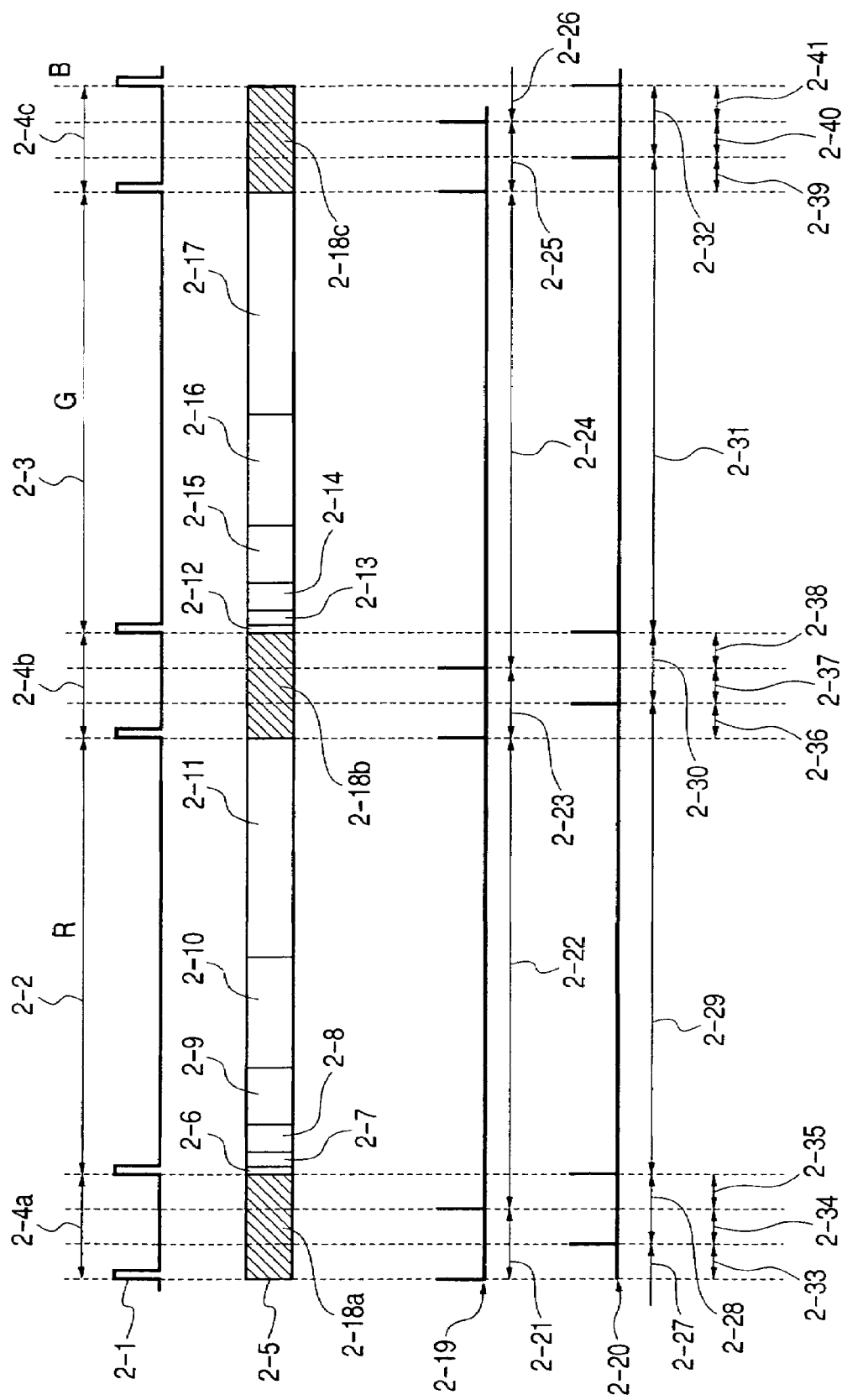
FIG. 2 is a timing chart illustrating the operation of the first embodiment.

The description of the embodiment will be given further. FIG. 2 shows an example of a display data train after PWM modulation when the color filter of the embodiment shown in FIG. 1 is used. In FIG. 2, the horizontal axis direction represents time. Reference numeral 2-1 represents a display start pulse for each RGB area and a white area between color areas, six areas in total, in one field. A period 2-2 is an R signal display period, a period 2-3 is a G signal display period, and a period not shown is a B signal display period. Periods 2-4a, 2-4b and 2-4c are display periods for the white luminance emphasizing signal between color regions set by the embodiment.

Reference numeral 2-5 represents PWM modulated display data of the embodiment. Reference numerals 2-6 to 2-11 represent PWM modulated R display data including a first bit 2-6, a second bit 2-7, a third bit 2-8, a fourth bit 2-9, a fifth bit 2-10, and a sixth bit 2-11. Similar to R, reference numerals 2-12 to 2-17 represent PWM modulated G display data including a first bit 2-12, a second bit 2-13, a third bit 2-14, a fourth bit 2-15, a fifth bit 2-16, and a sixth bit 2-17.

Reference symbols 2-18a, 2-18b and 2-18c represent white luminance emphasizing signals. For the purposes of simplicity, although the signals 2-18a, 2-18b and 2-18c are drawn as a single level signal having the same duration and a constant pulse width, they may be a multi level signal having a plurality of bits similar to each RGB signal. Although the signal having the same pulse width is used for the three white display areas, different pulse widths and tonal bits may be dispersed to the three white display areas to obtain a desired white luminance emphasized display during one cycle of 2-18a, 2-18b and 2-18c.

Figure 7:
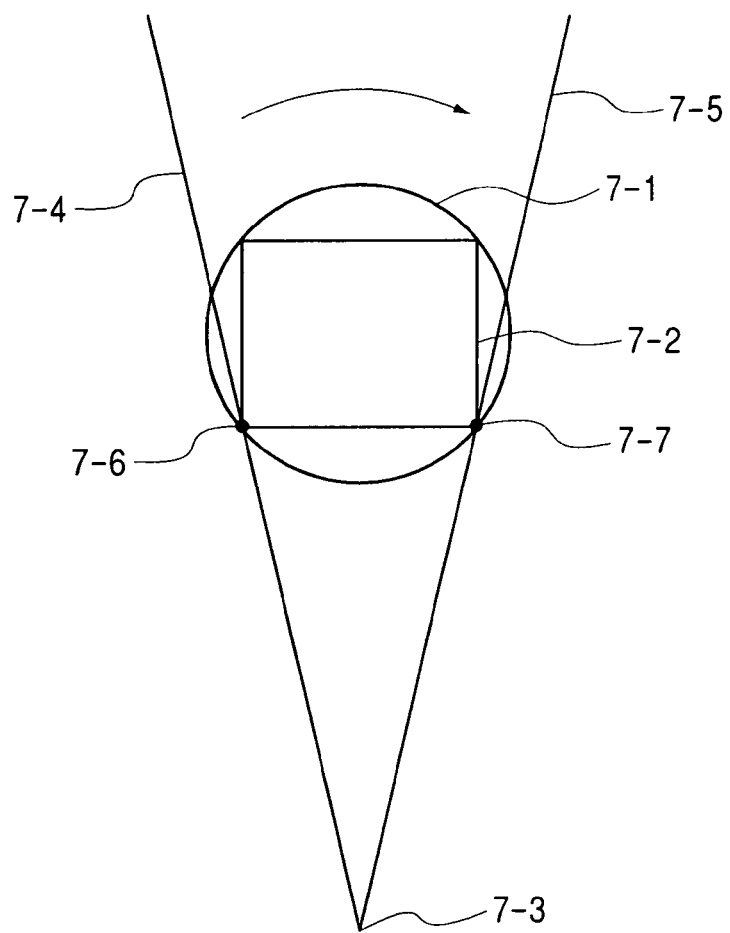
FIG. 7 is a diagram illustrating a conventional operation.

A positional relation between a spot diameter of illumination light on the rotary color filter and the color filter boundary is similar to the conventional relation shown in FIG. 7. In FIG. 2, reference numeral 2-19 represents a color period of the color filter at the point 7-6 shown in FIG. 7, reference numeral 2-22 represents an R period, reference numeral 2-24 represents a G period, and reference numeral 2-26 represents a B period. Reference numerals 2-21, 2-23 and 2-25 represent W (white) periods of the color filter shown in FIG. 1 corresponding to the white areas 1-6, 1-4 and 1-5.

Reference numeral 2-20 represents a color period of the color filter at the point 7-7 shown in FIG. 7, reference numeral 2-29 represents an R period, reference numeral 2-31 represents a G period, and reference numeral 2-27 represents a B period. Reference numerals 2-28, 2-30 and 2-32 represent W periods of the color filter shown in FIG. 1 corresponding to the white areas 1-6, 1-4 and 1-5.

As seen from FIG. 2, during each period 2-34, 2-37, 2-40, both the points 7-6 and 7-7 belong at the same time to the white region of the color filter are in the white area of the color filter, and the white luminance emphasizing signal is input. Therefore, the white luminance emphasizing process is performed for these white areas.

The area 2-33 is a white area at the point 7-6 shown in FIG. 7 and a B area at the point 7-7 so that a portion of the display unit surface is white and another portion is illuminated with light of another color (in this case, B). The area 2-36 is a white area at the point 7-6 shown in FIG. 7 and an R area at the point 7-7 so that a portion of the display unit surface is white and another portion is illuminated with light of another color (in this case, R). The area 2-39 is a white area at the point 7-6 shown in FIG. 7 and a G area at the point 7-7 so that a portion of the display unit surface is white and another portion is illuminated with light of another color (in this case, G). A ratio between colors in each area 2-33, 2-36, 2-39 changes with synchronization phases or the like of the color filter and display apparatus, and there is a variation in the ratios between display apparatus. However, in the same display apparatus, the ratio between colors in each area 2-33, 2-36, 2-39 is the same and the same white luminance emphasizing signal 2-18a, 2-18b and 2-18c is used. Therefore, even if a portion of the display unit surface is illuminated with light other than white light, each color is visually synthesized during one cycle and the visual color is recognized as white. In this manner, the effects of white luminance emphasizing display can be achieved. A conventional problem of color mixture in the color filter boundary areas can therefore be solved.

Similarly, the area 2-35 is a white area at the point 7-7 shown in FIG. 7 and an R area at the point 7-6 so that a portion of the display unit surface is white and another portion is illuminated with light of another color (in this case, R). The area 2-38 is a white area at the point 7-7 shown in FIG. 7 and a G area at the point 7-6 so that a portion of the display unit surface is white and another portion is illuminated with light of another color (in this case, G). The area 2-41 is a white area at the point 7-7 shown in FIG. 7 and a B area at the point 7-6 so that a portion of the display unit surface is white and another portion is illuminated with light of another color (in this case, B). A ratio between colors in each area 2-35, 2-38, 2-41 is generally the same and the same white luminance emphasizing signal 2-18a, 2-18b and 2-18c is used. Therefore, during one cycle, the effects of white luminance emphasizing display can be achieved and a problem of color mixture does not occur.

As above, not only during the periods 2-34, 2-37 and 2-40, but also during the periods 2-33, 2-36 and 2-39 and during the periods 2-35, 2-38 and 2-41, the white luminance emphasizing display can be performed. Accordingly, the period while the color filter rotates can be utilized effectively for display and the luminance can be increased. Lowering color impurity can also be avoided.

Particularly in the case of a display apparatus using a color field sequential display method, in order to suppress a characteristic color breakdown phenomenon, the number of divisions of the rotary color filter is increased to raise the image refreshing frequency. In such a case, a ratio of the alternate switching period to one color display period increases and the degree of lowering a luminance and color impurity becomes large. From the standpoint of this, the structure of this embodiment becomes more important.

An example of setting another region to the color boundary areas of a color filter is described in JP-A-09-149350 (Texas Instruments Incorporated). This example has, however, the characteristic point that an area having a neutralizing concentration of respective colors is set to the color boundary areas, and its object is to prolong the least significant bit (LSB) of data. The object of the invention is to increase luminance and prevent color purity from being lowered. The object and effects of the invention are quite different from those of this example.

JP-A-10-78550 (Texas Instruments Incorporated) makes public the invention which performs white luminance emphasis in the color boundary areas. Although this example has the same object of increasing the luminance, the white area is not set to the color filter as in the present invention, but a white luminance emphasizing signal is used only in the color boundary areas so that the white luminance emphasizing effects are about ⅓ those of the present invention. According to the present invention, not only a white emphasizing signal is applied to the color boundary area, but also the white areas are set in the color boundary area, thereby the luminance emphasizing process can be performed efficiently. And, since separated color areas are formed, it is possible to avoid color mixture and to prevent lowering color purity.

Second Embodiment

In the first embodiment, a white area is set to an area between color areas of a rotary color filter of a projection type image display apparatus of a color field sequential display type. The present invention is characterized in that a white color illumination period is set between illumination periods of a plurality of colors. Therefore, the present invention is applicable to all display apparatus so long as they are of the color field sequential display type. For example, the present invention is applicable to a projection type display apparatus having three liquid crystal filters capable of transmitting respective color components and an illumination unit for generating illumination light of each RGB color, and to a compact display apparatus such as a head mount display apparatus for displaying an image by sequentially emitting light from LEDs of three colors and reflecting the illumination light. The space modulation unit may be a MEMS type space modulation unit such as a DMD unit available from Texas Instruments Incorporated, or may be a liquid crystal display having a high speed response such as a ferroelectric liquid crystal (FLC) display, or the like.

Figure 10:
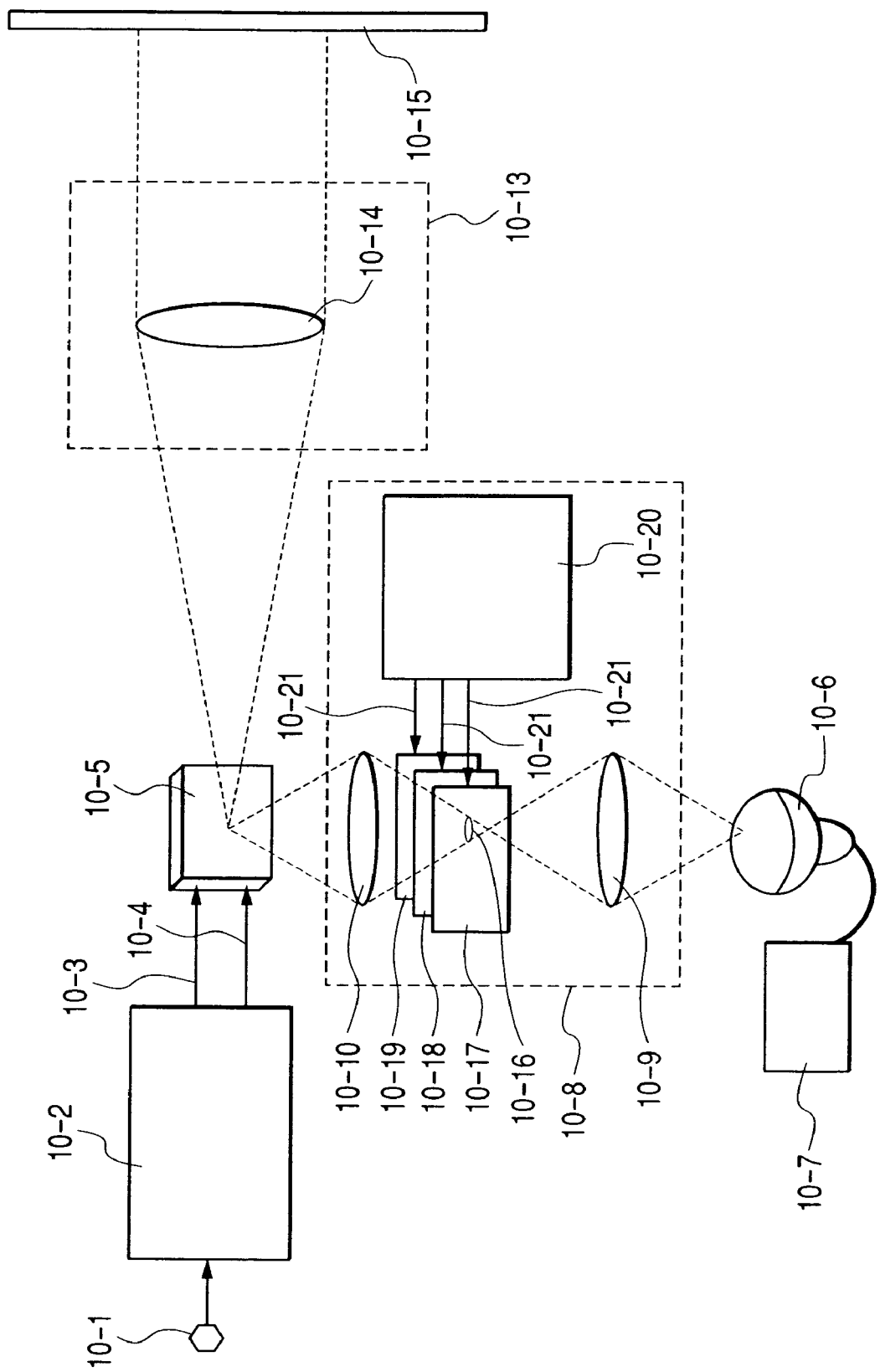
FIG. 10 is a diagram showing the structure of a projection type image display apparatus of a single plate type according to a second embodiment of the invention.

FIG. 10 shows an example of the structure of a projection type display apparatus having three liquid crystal filters capable of transmitting respective color components and an illumination unit for generating illumination light of each RGB color. In FIG. 10, reference numeral 10-1 represents an input unit for inputting an image signal, reference numeral 10-2 represents a signal processing unit for adjusting the image quality, such as a luminance, color characteristics, and gamma characteristics, of an input image signal and converting the image signal into a pulse width modulated time divisional signal suitable for driving a display unit, and for generating timing pulses for driving the display unit. Reference numeral 10-3 represents a data bus for transferring a time divisional signal to the display unit, and reference numeral 10-4 represents a control line for transferring a drive pulse to the display unit.

Reference numeral 10-5 represents a space modulation unit of binary value display, typically a micro-electro-mechanical systems (MEMS) type space modulation unit such as the DMD unit available from Texas Instruments Incorporated, or a liquid crystal display having a high speed response such as a ferroelectric liquid crystal (FLC) device. This space modulation unit is a reflection type display unit which reflects light. Reference numeral 10-6 represents a light source lamp. A metal halide lamp or the like is used for the projection type display apparatus. Reference numeral 10-7 represents a ballast and a power source for driving the lamp.

Reference numeral 10-8 represents an illumination optical system for generating RGB monochromatic light changing with time by using three liquid crystal filters capable of transmitting light components of respective colors and illuminating the space modulation unit 10-5 with monochromatic light. Reference numerals 10-9 and 10-10 represent lenses. Reference numeral 10-20 represents a drive unit for driving three liquid crystal filters 10-17, 10-18 and 10-19 which transmit respective colors. Reference numeral 10-21 represents a signal line and control line for driving the liquid crystal. Reference numeral 10-16 indicates a spot of converged illumination light passing through the liquid crystal color filter.

Reference numeral 10-13 represents a projection optical system for projecting light space-modulated by the space modulation unit 10-5 and containing display information, upon a display screen 10-15. Reference numeral 10-14 represents a lens and reference numeral 10-15 represents a screen.

Light emitted from the lamp 10-6 passes through the liquid crystal color filters 10-17, 10-18 and 10-19 to be converted into illumination light of color field sequential RGB. In accordance with drive signals 10-3 and 10-4 obtained by converting an image signal input from the input unit 10-1 into a time divisional signal at the signal processing unit 10-2, the space modulation unit 10-5 reflects space modulation light subjected to binary pulse width modulation. Space-modulated light is projected and displayed on the screen 10-15 via the projection optical system 10-13.

In this embodiment, a period for performing white color illumination by allowing light to pass through all filters is provided during each period while the liquid crystal display color filters 10-17, 10-18 and 10-19 are alternately switched. In this manner, a white luminance emphasizing process is performed.

Figure 11:
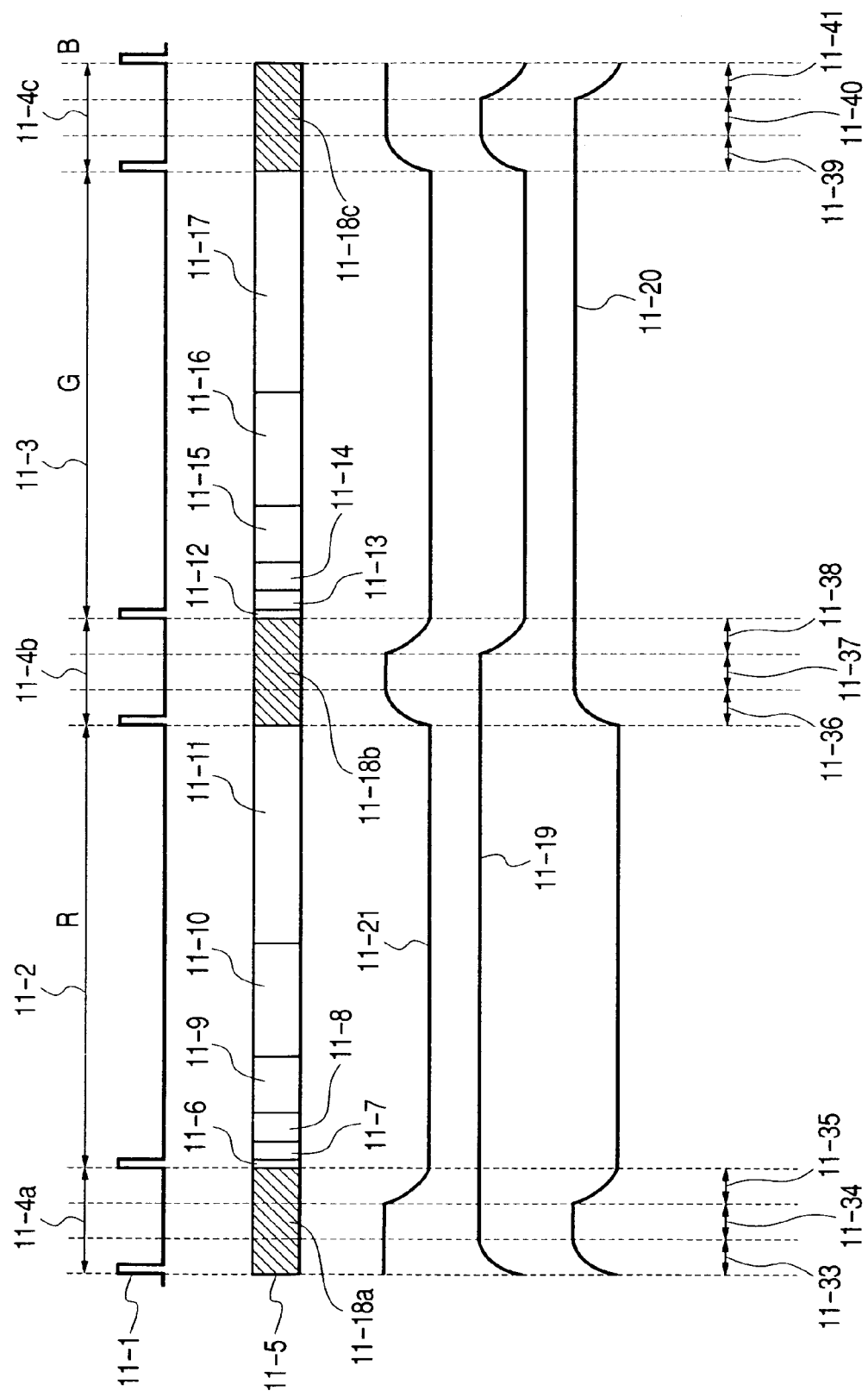
FIG. 11 is a timing chart illustrating the operation of the second embodiment.

FIG. 11 shows an example of a PWM modulated display data train. In FIG. 11 the horizontal axis direction represents time. Reference numeral 11-1 represents a start pulse for an image display of each RGB area and a white area between color areas, six areas in total. One field is constituted of an R signal display period 11-2, a G signal display period 11-3, and a B signal display period not shown in FIG. 11. Reference symbols 11-4a, 11-4b and 11-4c represent a display period for a white luminance emphasizing signal set in this embodiment between respective color areas.

Reference numeral 11-5 represents PWM modulated display data of the embodiment. Reference numerals 11-6 to 11-11 represent PWM modulated R display data including a first bit 11-6, a second bit 11-7, a third bit 11-8, a fourth bit 11-9, a fifth bit 11-10, and a sixth bit 11-11.

Similar to R, reference numerals 11-12 to 11-17 represent PWM modulated G display data including a first bit 11-12, a second bit 11-13, a third bit 11-14, a fourth bit 11-15, a fifth bit 11-16, and a sixth bit 11-17. Reference symbols 11-18a, 11-18b and 11-18c represent white luminance emphasizing signals. For the purposes of simplicity, although the signals 11-18a, 11-18b and 11-18c are drawn as a single level signal having the same duration and a constant pulse width, they may be a multi level signal having a plurality of bits similar to each RGB signal. Although the signal having the same pulse width is used, different pulse widths and tonal bits may be dispersed to three white display areas to obtain a desired white luminance emphasized display during one cycle of 11-18a, 11-18b and 11-18c.

A liquid crystal color filter has a response time taken to change a transmission factor after a signal is applied. Therefore, according to a conventional method, a transition period while each liquid crystal color filter is alternately switched cannot be used for image display if color impurity is given much importance. A light use efficiency is therefore lowered. If the liquid crystal color filter transition period is used for image display in order to increase the luminance, color mixture occurs and color purity lowers. In this embodiment, since the white period is provided between respective color periods, the light use efficiency can be improved and color purity can be prevented from being lowered, similar to the first embodiment.

Reference numeral 11-19 represents a change in the transmission factor of an R liquid crystal color filter, reference numeral 11-20 represents a change in the transmission factor of a G liquid crystal color filter, and reference numeral 11-21 represents a change in the transmission factor of a B liquid crystal color filter. A "High" level in 11-19 to 11-21 corresponds to a high transmission factor period, and a "Low" level corresponds to a low transmission factor period.

As seen from FIG. 11, the transmission factors of all the liquid crystal color filters are high during periods 11-34, 11-37 and 11-40. During these periods, white light is transmitted. Since a white luminance emphasizing signal is input during these periods, the white luminance emphasizing process is performed in the corresponding areas.

In an area 11-33, although the B liquid crystal color filter has a high transmission factor, the R and G filters are in the liquid crystal response period. In an area 11-36, although the R liquid crystal color filter has a high transmission factor, the G and B filters are in the liquid crystal response period. In an area 11-39, although the G liquid crystal color filter has a high transmission factor, the R and B filters are in the liquid crystal response period. A ratio between colors in each area 11-33, 11-36, 11-39 changes with synchronization phases or the like of the liquid crystal color filter responses and display apparatus, and there is a variation in the ratios between display apparatus. However, in the same display apparatus, the response speed of each color in each area 11-33, 11-36, 11-39 is generally the same and the same white luminance emphasizing signal 11-18a, 11-18b and 11-18c is used. Therefore, the white luminance emphasizing display effects can be obtained during one cycle. A conventional problem of color mixture during the liquid crystal color filter response periods can therefore be solved.

Similarly, in an area 11-35, although the R liquid crystal color filter has a high transmission factor, the G and B filters are in the liquid crystal response period. In an area 11-38, although the G liquid crystal color filter has a high transmission factor, the R and B filters are in the liquid crystal response period. In an area 11-41, although the B liquid crystal color filter has a high transmission factor, the R and G filters are in the liquid crystal response period. A ratio between colors in each area 11-35, 11-38, 11-41 is the same and the same white luminance emphasizing signal 11-18a, 11-18b and 11-18c is used. Therefore, during one cycle, the effects of white luminance emphasizing display can be achieved and a problem of color mixture does not occur.

As above, not only during the periods 11-34, 11-37 and 11-40, but also during the periods 11-33, 11-36 and 11-39 and during the periods 11-35, 11-38 and 11-41, the white luminance emphasizing display can be performed. Accordingly, the period while the liquid color filters are switched can be utilized effectively for display and the luminance can be increased. Lowering color impurity can also be avoided.

Third Embodiment

In the third embodiment of the invention, a projection type image display apparatus having the same structure as that of the first embodiment is used and a multi level signal made of a plurality of pulses is used as a white luminance emphasizing signal. A rotary color filter plate corresponding to the color plate 3-12 shown in FIG. 3 has the structure shown in FIG. 12.

Figure 12:
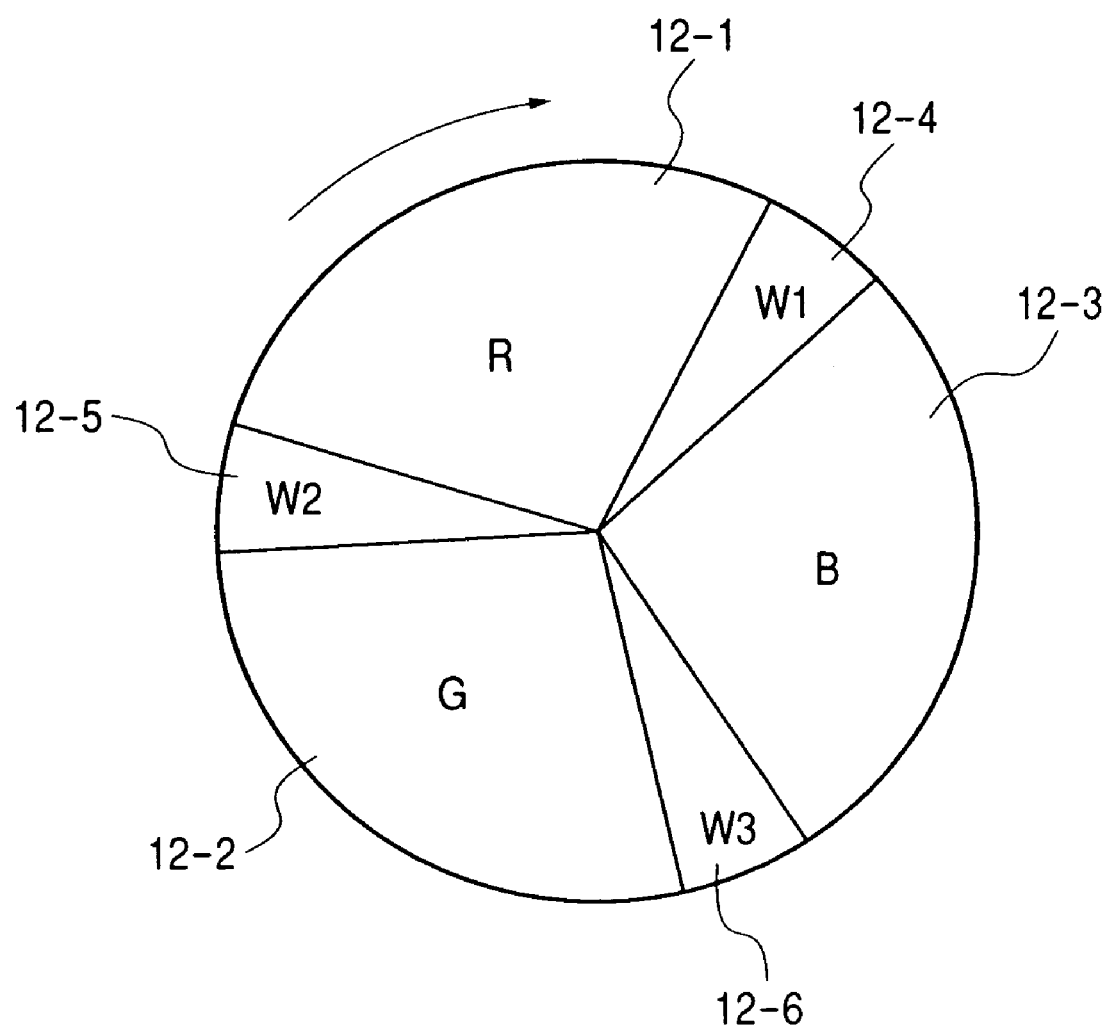
FIG. 12 is a diagram showing the structure of a rotary color filter according to a third embodiment of the invention.

Referring to FIG. 12, a color filter has, in addition to the conventional three divisional color areas (FIG. 3), three white (W) areas set to the three color boundary areas between R and G, G and B, and B and R. The color filter has an R (red) light transmitting area 12-1, a G (green) light transmitting area 12-2 and a B (blue) light transmitting area 12-3, as well as three white (W) areas 12-4 W1, 12-5 W2 and 12-6 W3 set to the boundary areas between RGB colors.

Also in this embodiment, a white area is set to each color boundary area to dispersively perform a white luminance emphasizing process. Under the conditions that a multi level PWM signal is used as the white luminance emphasizing signal, the white luminance emphasizing process is dispersively performed in the boundary areas. In this case, it is possible to avoid color mixture and a variation (irregularity) in luminance and color on the surface of the space modulation unit. This method will be disclosed.

Figure 13:
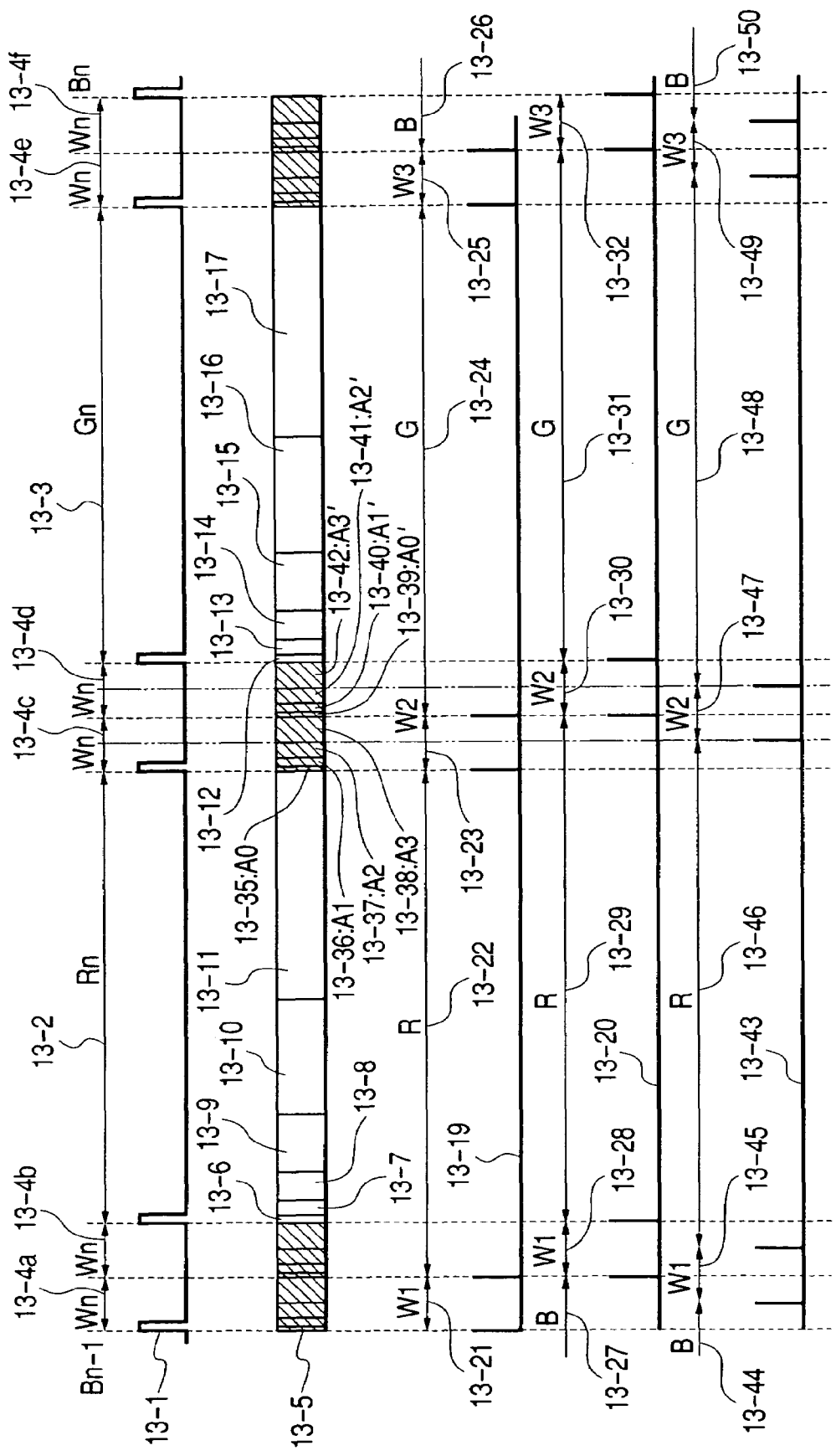
FIG. 13 is a timing chart illustrating the operation of the third embodiment.

FIG. 13 is a timing chart illustrating a positional relation between a PWM modulated signal using the color filter shown in FIG. 12 of this embodiment and the illumination area of the color filter. In FIG. 12, the horizontal axis direction represents time. Reference numeral 13-1 represents a start pulse for an image display of each RGB area and a white area between color areas in one field, six areas in total. One field is constituted of an R signal display period (Rn) 13-2 of an n-th field, a G signal display period (Gn) 13-3 of the n-th field, and a B signal display period (Bn) of the n-th field not shown after the white luminance emphasizing signal display period.

Reference numeral 13-5 represents PWM modulated display data of the embodiment. Reference numerals 13-6 to 13-11 represent PWM modulated R display data including a first bit 13-6, a second bit 13-7, a third bit 13-8, a fourth bit 13-9, a fifth bit 13-10, and a sixth bit 13-11. Similar to R, reference numerals 13-12 to 13-17 represent PWM modulated G display data including a first bit 13-12, a second bit 13-13, a third bit 13-14, a fourth bit 13-15, a fifth bit 13-16, and a sixth bit 13-17.

Reference symbols 13-4a, 13-4b, 13-4c, 13-4d, 13-4e and 13-4f represent a display period for a white luminance emphasizing signal set in this embodiment between respective color areas. The display periods 13-4a and 13-4b are used as the display periods for the white luminance emphasizing signal between the B and R signal periods. The display periods 13-4c and 13-4d are used as the display periods for the white luminance emphasizing signal between the R and G signal periods. The display periods 13-4e and 13-4f are used as the display periods for the white luminance emphasizing signal between the G and B signal periods.

The six display periods 13-4a, 13-4b, 13-4c, 13-4d, 13-4e and 13-4f are each a display period for a 4-bit PWM modulated signal (Wn) dispersed to three boundary areas as the white luminance emphasizing signal of the n-th field. The same signal is used in the same field.

In the period 13-4c, a 4-bit white luminance emphasizing signal Wn dispersed to each boundary area has a first bit (A0) 13-35, a second bit (A1) 13-36, a third bit (A2) 13-37 and a fourth bit (A3) 13-38. In the period 13-4d, the signal Wn has a first bit (A0') 13-39, a second bit (A1') 13-40, a third bit (A2') 13-41 and a fourth bit (A3') 13-42. Since the signal during the period 13-4c is equal to that during the period 13-4d, the signals of the same bit are also equal (A0=A0', A1=A1', A2=A2' and A3=A3'). Similarly, since the signals during the periods 13-4a, 13-4b, 13-4e and 13-4f are equal to the signals during the periods 13-4c and 13-4d, the signals of the same bit are equal.

The positional relation between the spot diameter of illumination light on the rotary color filter and each boundary of the color filter is shown in FIG. 7 similar to a conventional example. Referring to FIG. 13, reference numeral 13-19 represents a color period of the color filter at the point 7-6 shown in FIG. 7, which period includes a white period (W1) 13-21, a red period (R) 13-22, a white period (W2) 13-23, a green period (G) 13-24, a white period (W3) 13-25, and a blue period (B) 13-26. W1, W2 and W3, and R, G and B shown in FIG. 13 correspond to W1, W2, W3, and R, G and B of the color filter shown in FIG. 12.

Reference numeral 13-20 represents a color period of the color filter at the point 7-7 shown in FIG. 7, which period includes a blue period (B) 13-27, a white period (W1) 13-28, a red period (R) 13-29, a white period (W2) 13-30, a green period (G) 13-31, and a white period (W3) 13-32.

Reference numeral 13-43 represents a color period of the color filter at an approximately middle point between the points 7-6 and 7-7 shown in FIG. 7, which period includes a blue period (B) 13-44, a white period (W1) 13-45, a red period (R) 13-46, a white period (W2) 13-47, a green period (G) 13-48, a white period (W3) 13-49, and a blue period (B) 13-50.

As seen from FIG. 13, the position of a color segment of the color filter relative to the PWM modulated signal train 13-5 changes from 13-19, 13-20 and to 13-43 with the position of a spot of illumination light, so that for example, the white segment (W2) period of the color filter changes from 13-23 to 13-30 and to 13-47. As different from the first embodiment, the white luminance emphasizing signal dispersed to the boundary areas is a multi level PWM modulated signal. Therefore, a display luminance of the white luminance emphasizing signal in the white segment (W2) at each position of the spot is determined by an integrated value of the PWM modulated signal trains in the periods 13-23, 13-30 and 13-47 each corresponding to the illumination light transition period (period determined by the size of the spot on the color filter plate), cut from the periods 13-4c and 13-4d corresponding to about two times the illumination light transition period.

In this embodiment, in order to avoid a variation (irregularity) of luminance on the display surface at each position of the spot, the same PWM modulated signal trains are applied twice during the periods 13-4c and 13-4d.

Specifically, in the display period 13-19 and during the white segment (W2) period 13-23, the luminance is an integrated value of pulse trains A0, A1, A2 and A3 13-35 to 13-38. In the display period 13-20 and during the white segment (W2) period 13-23, the luminance is an integrated value of pulse trains A0', A1', A2' and A3' 13-39 to 13-42. Since the signal during the period 13-4c and that during the period 13-4d are equal, A0=A0', A1=A1', A2=A2', and A3=A3' and the luminance at the point 7-6 shown in FIG. 7 is equal to the luminance at the point 7-7. At the middle point 13-43 between the points 7-6 and 7-7 shown in FIG. 7 and during the period 13-47, the luminance is an integrated value of an end portion of the pulse 13-37, the pulses 13-38, 13-39, and 13-40, and the pulse 13-41 excepting an end portion thereof. Therefore, the luminance is equal to that during the periods 13-4c and 13-4d. Therefore, the luminance by the white luminance emphasizing dispersion signal is maintained equal on the display surface during the whole illumination light transition period.

In this embodiment, in order to avoid a color variation (irregurality) on the display surface to be caused by color mixture, the same white luminance emphasizing signal is used during three boundary periods between red and green, between green and blue, and between blue and red. Specifically, during the three boundary periods between 13-4a and 13-4b, between 13-4c and 13-4d, and between 13-4e and 13-4f, the same signal Wn is applied twice consecutively.

For example, in the color period 13-19 of the color filter at the point 7-6 shown in FIG. 7 and during the period 13-4b among the white luminance emphasizing signal periods 13-4a and 13-4b remote from the white segment (W1) period 13-21, the white luminance emphasizing signal is applied by using the red color filter. Next, similarly, during the period 13-4d, the white luminance emphasizing signal is applied by using the green color filter. During the period 13-4f, the white luminance emphasizing signal is applied by using the blue color filter. Accordingly, each display during the periods 13-4b, 13-4d and 13-4f is visually synthesized during one cycle and the white display by the white luminance emphasizing signal can be realized. The white luminance emphasizing signal will not generate color display components other than white and color mixture can be avoided.

Similarly, in the color period 13-20 of the color filter and during the period 13-4a, the white luminance emphasizing signal is applied by using the blue color filter. Next, similarly, during the period 13-4c, the white luminance emphasizing signal is applied by using the red color filter. During the period 13-4e, the white luminance emphasizing signal is applied by using the green color filter. Accordingly, each display during the periods 13-4a, 13-4c and 13-4e is visually synthesized during one cycle and the white display by the white luminance emphasizing signal can be realized. The white luminance emphasizing signal will not generate color display components other than white and color mixture can be avoided.

During the period 13-43 even at the middle point 13-43 between the points 7-6 and 7-7 shown in FIG. 7, the white luminance emphasizing signal will not generate color display components other than white and color mixture can be avoided, from the same reason described above. A color variation (irregularity) on the display surface will not be generated.

The white luminance emphasizing dispersion signal Wn applies pulse trains whose integrated value corresponds to a quarter of the final luminance by the white luminance emphasizing process. The reason for this is as follows. For example, at the point 7-6 shown in FIG. 7, during each period 13-4a, 13-4c, 13-4e, a white color display is obtained, and during the periods 13-4b, 13-4d and 13-4f, the white color display is obtained only after one cycle. This is equivalent to that the white color display is obtained by applying the Wn signal four times during one rotation of the color filter.

As above, a white tonal level modulating signal having a length corresponding to the illumination light transition period is applied twice as the white luminance emphasizing dispersion signal, the signal period having a length two times the illumination light transition period is provided overlapping the white illumination period, and the white luminance emphasizing process using a multi level signal is performed dispersively. It is therefore possible to suppress an irregularity of luminance and color on the display surface and obtain a high luminance display without color mixture. Since a multi level pulse train can be used, the degree of the luminance emphasizing effects can be set flexibly and a display apparatus having a high performance and high image quality can be realized.

In the first to third embodiments, the illumination unit is used by setting a white color illumination period at each boundary area between illumination periods of three primary colors of R (red), G (green) and B (blue). The color illumination periods are not limited only to the three primary colors, but complementary cyan, magenta, and yellow, or four colors of the three primary color and another color may also be used.

In the first and third embodiments, a white color illumination period is set to each boundary area between color areas of the rotary color filter divided into three primary colors. The number of divisions of a rotary color filter is not limited only to three, but it is obvious that the invention is applicable to six divisions, nine divisions and the like. In the fourth embodiment, the rotary color filter is divided into multi areas, and not only the same signal is applied to each boundary area as in the first to third embodiments, but also boundary areas are classified into a plurality of groups and different luminance emphasizing signals are dispersed to each group to obtain flexible luminance emphasizing effects.

Fourth Embodiment

In the fourth embodiment of the invention, a projection type image display apparatus having the same structure as that of the first embodiment shown in FIG. 3 is used and the embodiment is applied to a boundary area of a multi division rotary color filter. The rotary color filter plate corresponding to the plate 3-12 shown in FIG. 3 is characteristic to this embodiment and has the structure shown in FIG. 14.

Figure 14:
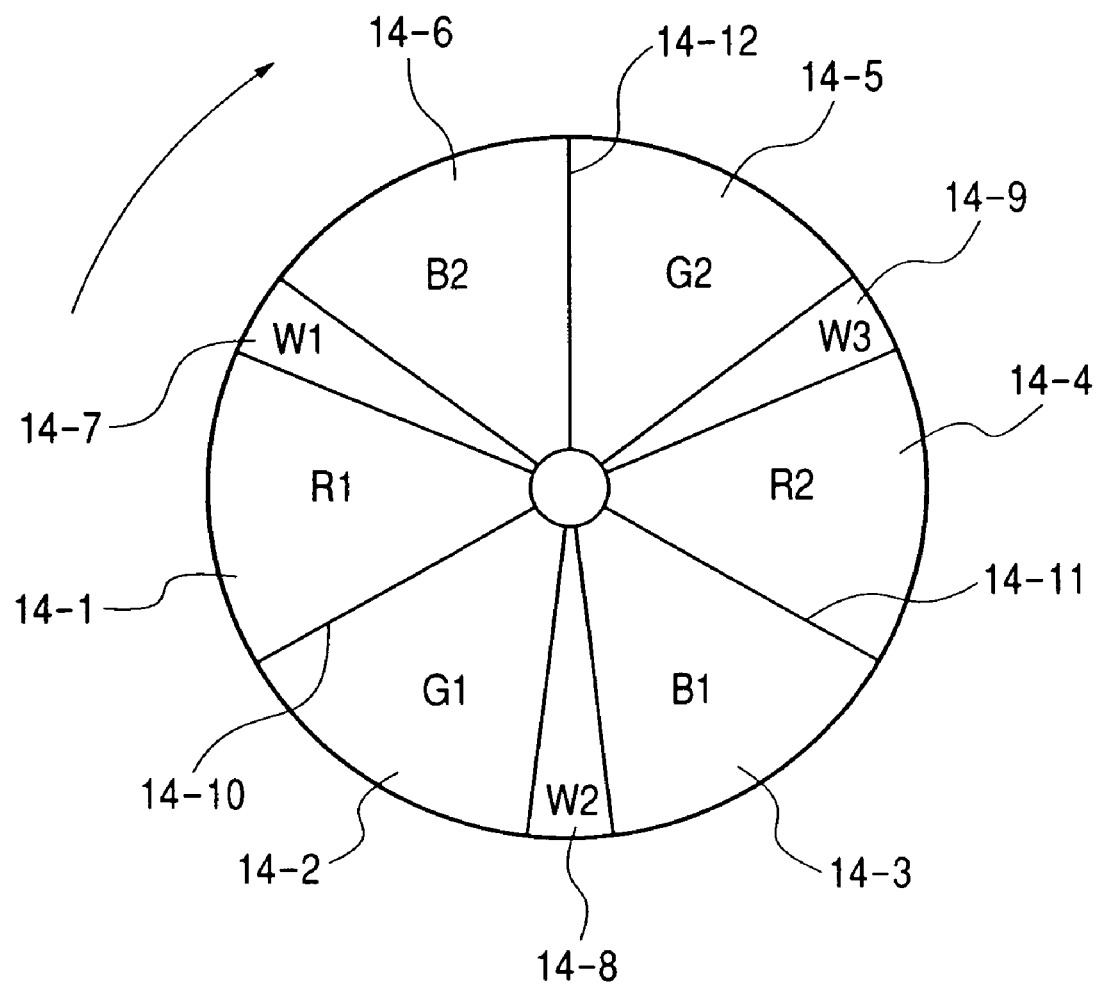
FIG. 14 is a diagram showing the structure of a rotary color filter according to a fourth embodiment of the invention.

Referring to FIG. 14, as different from a conventional rotary color filter plate, the color filter plate of this embodiment has two division areas of each of R (red), G (green) and B (blue), and three white color filter areas are set to color boundary areas.

The color filter has a first red area (R1) 14-1, a first green area (G1) 14-2, a first blue area (B1) 14-3, a second red area (R2) 14-4, a second green area (G2) 14-5, and a second blue area (B2) 14-6, each transmitting corresponding color components. Three white (W) areas 14-7 W1, 14-8 W2 and 14-9 W3 are set to each color boundary area. Reference numerals 14-10, 14-11 and 14-12 represent a boundary to which the white color area is not set.

In this embodiment, the white color illumination area is not set to all of the six boundary areas, but the boundary areas are classified into a plurality of groups. Some groups are set with the white color illumination area, and other groups are not set with the white color illumination area.

The white display signal uses a period two times the illumination light transition period in the boundary area set with the white color illumination area. Therefore, if the white color illumination area is set to all the boundary areas, the display period of each RGB monochromatic color becomes short. The white luminance emphasizing effects may be increased unnecessarily in some cases.

In this embodiment, a plurality of groups are classified into the groups set with the white color illumination area and the groups not set with the white color illumination area. It is therefore possible not to set the areas for the white luminance emphasizing process unnecessarily and to disperse the signals for the white luminance emphasizing process at a proper rate.

Also in this embodiment, the white luminance emphasizing signal is not dispersed to all of the six boundary areas, but the boundary areas are classified into a plurality of groups and a different dispersion signal for the white luminance emphasizing process is applied to each group. Therefore, it is possible to set a proper degree of the emphasizing effects and generate the tonal signal flexibly.

Figure 15:
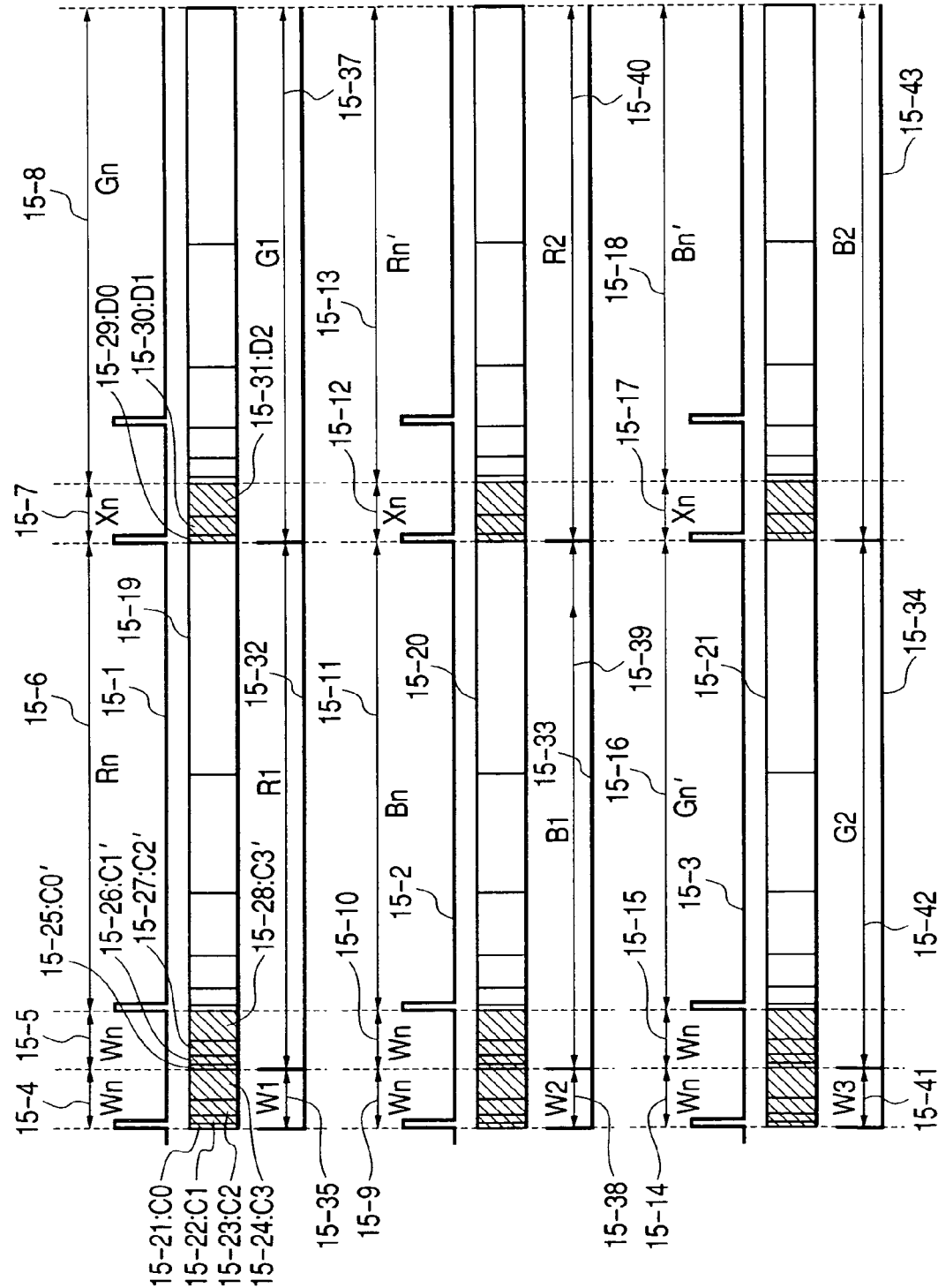
FIG. 15 is a timing chart illustrating the operation of the fourth embodiment.

FIG. 15 a timing chart illustrating a positional relation between a PWM modulated signal using the color filter shown in FIG. 14 of this embodiment and the illumination area of the color filter. In FIG. 14, the horizontal axis direction represents time. Reference numerals 15-1, 15-2 and 15-3 represent time consecutive start pulses for an image display of each RGB area and an area between color areas, twelve areas in total. Reference numerals 15-19, 15-20 and 15-21 represent time consecutive data trains of the PWM modulated signal for an image display of each RGB area and an area between color areas, twelve areas in total. A period 15-6 is a first R signal display period (Rn) of an n-the field, a period 15-8 is a first G signal display period (Gn) of the n-the field, and a period 15-11 is a first B signal display period (Bn) of the n-the field. A period 15-13 is a second R signal display period (Rn') of the n-the field, a period 15-16 is a second G signal display period (Gn') of the n-the field, and a period 15-18 is a second B signal display period (Bn') of the n-the field.

During periods 15-4 and 15-5, during periods 15-9 and 15-10 and during periods 15-14 and 15-15, the PWM modulated signal Wn for the white luminance emphasizing process is applied consecutively twice overlapping the white color illumination area similar to the third embodiment.

Reference numerals 15-4 and 15-5 represent a display period for the white luminance emphasizing signal during a period between color periods B2 and R1 shown in FIG. 14, reference numerals 15-9 and 15-10 represent a display period for the white luminance emphasizing signal during a period between color periods G1 and B1, and reference numerals 15-14 and 15-15 represent a display period for the white luminance emphasizing signal during a period between color periods R2 and G2. The six periods 15-4, 15-5, 15-9, 15-10, 15-14, and 15-15 are each a display period for a 4-bit PWM modulated signal (Wn) dispersed to three boundary areas as $\alpha$ time ($\alpha \leq 1$) the white luminance emphasizing signal of the n-th field. The same signal is used in the same field.

In periods 15-7, 15-12 and 15-17, the PWM modulated signal train Xn for the white luminance emphasizing process not overlapping the white color illumination area is applied once during the transition period in a color boundary area.

The three periods 15-7, 15-12, and 15-17 are each a display period for a 3-bit PWM modulated signal (Xn) dispersed to three boundary areas as (1-$\alpha$) time ($\alpha \leq 1$) the white luminance emphasizing signal of the n-th field. The same signal is used in the same field.

In the period 15-4, the 4-bit white luminance emphasizing signal Wn dispersed to each boundary area has a first bit (C0) 15-21, a second bit (C1) 15-22, a third bit (C2) 15-23 and a fourth bit (C3) 15-24. In the period 15-5, the signal Wn has a first bit (C0') 15-25, a second bit (C1') 15-26, a third bit (C2') 15-27 and a fourth bit (C3') 15-28. Since the signal bit (C2') 15-27 and a fourth bit (C3') 15-28. Since the signal during the period 15-4 is equal to that during the period 15-5, the signals of the same bit are also equal (C0=C0', C1=C1', C2=C2' and C3=C3'). Similarly, since the signals during the periods 15-9, 15-10, 15-14 and 15-15 are equal to the signals during the periods 15-4 and 15-5, the signals of the same bit are equal.

In the period 15-7, the 3-bit white luminance emphasizing signal Xn dispersed to each boundary area has a first bit (D0) 15-29, a second bit (D1) 15-30, and a third bit (D2) 15-31. Since the signal during the periods 15-12 and 15-17 is equal to that during the period 15-7, the signals of the same bit are also equal.

The positional relation between the spot diameter of illumination light on the rotary color filter and each boundary of the color filter is shown in FIG. 7 similar to a conventional example. Referring to FIG. 15, periods 15-32, 15-33 and 15-34 are time consecutive and are the color periods of the color filter at the point 7-6 shown in FIG. 7. The color periods include a white period (W1) 15-35, a red period (R1) 15-36, a green period (G1) 15-37, a white period (W2) 15-38, a blue period (B1) 15-39, a red period (R2) 15-40, a white period (W3) 15-41, a green period (G2) 15-42, and a blue period (B2) 15-43. W1, W2, W3, R1, G1, B1, R2, G2, and B2 shown in FIG. 15 correspond to areas of W1, W2, W3, R1, G1, B1, R2, G2 and B2 of the color filter shown in FIG. 14, respectively.

Although only the illumination period of the color filter at the point 7-6 shown in FIG. 7 is shown, as apparent from the third embodiment, even if the positional relation of the color segment of the color filter relative to the PWM modulated signal train changes with the position of the spot of illumination light, the luminance and color on the display surface by the white luminance emphasizing dispersion signal Wn are maintained equal because the same PWM modulated signal train is applied twice to the white illumination area. Although the PWM modulated signal train Xn is applied only once to the boundary area not inserted with the white illumination area, the same signal is applied during the periods 15-7, 15-12 and 15-17. Therefore, each RGB component is visually synthesized during one cycle at an arbitrary position of the illumination light spot so that the white display can be realized and the luminance and color can be maintained equal on the display surface.

The white luminance emphasizing dispersion signal Wn applies pulse trains whose integrated value corresponds to a quarter of the final luminance by the white luminance emphasizing process multiplied by $\alpha$ ($\alpha \leq 1$). The reason for this is as follows. For example, at the point 7-6 shown in FIG. 7, during each period 15-4, 15-9, 15-14, a white color display is obtained, and during the periods 15-5, 15-10 and 15-14, the white color display is obtained only after one cycle. This is equivalent to that the white color display is obtained by applying the Wn signal four times during one rotation of the color filter.

The white luminance emphasizing dispersion signal Xn applies pulse trains whose integrated value corresponds to (1-$\alpha$) time the final luminance by the white luminance emphasizing process. The reason for this is as follows. For example, at the point 7-6 shown in FIG. 7, during the periods 15-7, 15-12 and 15-17, the white color display is obtained only after one cycle. This is equivalent to that the white color display is obtained by applying the Xn signal once during one rotation of the color filter.

In this embodiment, the white luminance emphasizing process is performed by using both the dispersion signals Xn and Wn. As apparent from the embodiment, both the signals Xn and Wn are perfectly independent from each other. Therefore, the signals may be used complementarily as in this embodiment or may be used for other purposes.

An example of complementarily using the signals will be given. If the same signals Xn and Wn are used and the white luminance emphasizing signal is simply divided into five bits, the pulse width of the least significant bit (LSB) becomes too narrow and the drive speed of the space modulation unit may not follow. In this case, since the signal Wn has a luminance four times that of the signal Xn, the signal Xn is assigned to the lower bits and the signal Wn is assigned to the upper bits. With this arrangement, the bit width of the lower bit does not become too narrow, whereas the bit width of the upper bit can be narrowed to ¼. Therefore, the bits can be assigned properly in a limited time. In this case, it is obvious that the signals Xn and Wn may have a proper non-display period without making the white emphasizing signal correspond 100% to the whole white display period. With this arrangement, the luminance emphasizing signal can be applied flexibly.

An example of using the signals for other purposes will be given. The signal Wn is used for the white emphasizing process, whereas the signal Xn is used as a correction signal for a response speed, a word length diffusion or the like. It is obvious that the same signals Xn and Wn may be used.

Of the boundary areas of three primary colors, three boundary areas constituted of a pair of different colors (e.g., for the three primary colors of RGB, the boundary areas between R and G, G and B, and B and R) are used as one group. The same signal such as Xn and Wn is applied to the boundary areas of the same group. Therefore, a display using a multi level signal can be realized during one cycle of the illumination light, without irregularity of the luminance and color on the display surface.

Groups are classified to those with the white color illumination area and those without the white color illumination area. Therefore, without setting areas for the white luminance emphasizing process unnecessarily, signals for the white luminance emphasizing process can be dispersed at a proper ratio.

By applying different signals Xn and Wn to a plurality of groups, a limit of the pulse width of the LSB bit can be avoided as described earlier. It is therefore possible to increase the degree of signal freedom and design the signal processing flexibly.

By applying different signals Xn and Wn to a plurality of groups and by providing the signals with different functions, a multi function display can be realized.

In this case, a modulated signal for a white color gradation display having a length corresponding to the transition period of illumination light is applied twice, as a dispersion signal for the white luminance emphasizing process, to the boundary area with a white illumination area, to thereby provide a signal period twice the length corresponding to the illumination light transition period, the signal period overlapping a white color illumination period. It is therefore possible to dispersively perform the white luminance emphasizing process using a multi level signal.

As described so far, according to the invention, in a display apparatus of a color field sequential display type, a color boundary period which cannot be utilized conventionally for display because of lowered color purity can be used and a light use efficiency can be improved. By setting the white luminance emphasizing signal application period equal to or longer than the white illumination period, color mixture otherwise generated by different colors in the boundary period can be avoided. Furthermore, the white luminance emphasizing signal synthesized during one cycle of color periods contributes to a display and color purity can be improved. Accordingly, it is possible to provide an inexpensive and high quality image display apparatus without using specific electronic circuits and optical systems of high performance and large scale.

A modulated signal for a white color gradation display having a length corresponding to the transition period of illumination light is applied twice, to thereby provide a signal period twice the length corresponding to the illumination light transition period, the signal period overlapping a white color illumination period. It is therefore possible to make the relation between illumination light and signals uniform on the display surface of the space modulation unit. Accordingly, it is possible to use a multi level signal as a signal applied during the white illumination period and realize a high image quality thorough a flexible luminance emphasizing process.

A plurality of groups each constituting three boundary periods between red and green, green and blue, and blue and red of the illumination periods of three primary colors are classified into a first group and a second group. The first group has a white color illumination period during each boundary period, the white illumination period having a length corresponding to an illumination light transition period, and the second group has no such a white color illumination period during each boundary period. For the first group, a modulated signal for a white color gradation display having a length corresponding to the transition period of illumination light is applied twice, a signal period overlapping a white color illumination period. For the second group, a modulated signal for a white color gradation display having a length corresponding to the transition period of illumination light is applied once, a signal period overlapping each boundary period. By using a combination of a group with a boundary period having a white color illumination period and a group with a boundary area without the white color illumination period, a proper luminance emphasizing effect can be obtained even if the number of divisional color segments of a rotary color filter is increased or even if a color switching speed of illumination color is increased. If signals for a plurality of groups are used in combination, a signal dispersing and using method can be made versatile and an image display apparatus providing rich expression can be realized.

What is claimed is:
1. An image display apparatus comprising:
space modulation means for modulating incident light according to input display data and outputting the modulated incidence light;
illumination means for illuminating said space modulation means with light; and
projection means for projecting light emitted from said space modulation means upon an image display screen,
wherein said illumination means repeats one illumination cycle having a plurality of periods, which include at least periods for illuminating said space modulation means with lights of first, second and third colors which are different from white and different from one another, and two discontinuous periods for illuminating said space modulation means with a white light, wherein the space modulation means modulates respectively the lights of the first, second and third colors and the white light, and wherein, during the one illumination cycle, the period for illuminating said space modulation means with the white light starts after each one of the periods for illuminating said space modulation means with the lights of at least two of the first, second and third colors, and before the period for illuminating said space modulation means with the light of the other color.

2. An image display apparatus according to claim 1, wherein during the discontinuous periods for illuminating with the white light, a white luminance emphasizing process is dispersively performed.

3. An image display apparatus according to claim 1, wherein a white luminance emphasizing process is performed by applying a white luminance emphasizing signal during a period which is longer than one of the white light illumination periods.

4. An image display apparatus according to claim 1, wherein said space modulation means is a space modulation unit for performing time divisional modulation.

5. An image display apparatus according to claim 1, wherein said space modulation means is a space modulation unit using a liquid crystal.

6. An image display apparatus according to claim 1, wherein said space modulation means is a space modulation unit of a MEMS type.

7. An image display apparatus according to claim 1, wherein said space modulation means is a space modulation unit disposed with micro-mirrors.

8. An image display apparatus according to claim 1, wherein said illumination means generates color field sequential illumination light by using a rotary color filter divided into a plurality of areas having different transmission wavelength bands.

9. An image display apparatus according to claim 1, wherein said illumination means generates color field sequential illumination light by switching between a plurality of liquid crystal filters having different transmission wavelength bands.

10. An image display apparatus according to claim 1, wherein said illumination means generates color field sequential illumination light by switching between light sources such as LED.

11. An image display method comprising steps of:
conducting repeatedly one light output cycle having a plurality of periods;
illuminating a space modulator with a light outputted in the light output cycle; and
modulating the light output in the light cycle according to input data by the space modulator, which modulates respectively lights of first, second and third colors and a white light, wherein the plurality of periods include at least periods for illuminating the space modulator with the lights of the first, second and third colors which are different from white and different from one another, and two discontinuous periods for illuminating the space modulator with the white light, and wherein, during the one illumination cycle, the period for illuminating the space modulator with the white light starts after each one of the periods for illuminating the space modulator with the lights of at least two of the first, second and third colors, and before the period for illuminating the space modulator with the light of the other color.

12. An image display apparatus comprising:
a space modulator modulating incident light according to input display data and outputting the modulated incidence light; and
an illuminator illuminating said space modulator with light, wherein said illuminator repeats one illumination cycle having a plurality of periods, which include at least periods for illuminating said space modulator with lights of first, second and third colors which are different from white and different from one another, and two discontinuous periods for illuminating said space modulator with a white light, wherein the space modulator modulates respectively the lights of the first, second and third colors and the white light, and wherein, during the one illumination cycle, the period for illuminating said space modulator with the white light starts after each one of the periods for illuminating said space modulator with the lights of at least two of the first, second and third colors, and before the period for illuminating said space modulator with the light of the other color.

13. An image display apparatus according to claim 12, wherein, during the two discontinuous periods for illuminating with the white light, a white luminance emphasizing process is dispersively performed.

14. An image display apparatus according to claim 12, wherein a white luminance emphasizing process is performed by applying a white luminance emphasizing signal during a period which is longer than one of the white light illumination periods.

15. An image display apparatus according to claim 12, wherein, during the one illumination cycle, the period for illuminating said space modulator with the white light starts after each one of the periods for illuminating said space modulator with the lights of the first, second and third colors, and before the period for illuminating said space modulator with the light of the color.

* * * * *